United States Patent
Lec

(12) 
(10) Patent No.: US 6,532,833 B1
(45) Date of Patent: Mar. 18, 2003

(54) TORQUE MEASURING PIEZOELECTRIC DEVICE AND METHOD

(76) Inventor: Ryszard Marian Lec, 8424 Shawnee St., Philadelphia, PA (US) 19118

( * ) Notice: Subject to any disclaimer, the term of this patent is extended or adjusted under 35 U.S.C. 154(b) by 0 days.

(21) Appl. No.: 09/280,959

(22) Filed: Mar. 29, 1999

Related U.S. Application Data

(60) Provisional application No. 60/111,487, filed on Dec. 7, 1998.

(51) Int. Cl.$^7$ ................................................. G01L 1/22
(52) U.S. Cl. ................................ 73/862.338; 73/862.12
(58) Field of Search ........................... 73/862.338, 854, 73/862.325, 593, 862.12, 862.191, 862.321, 849, 853; 366/349

(56) References Cited

U.S. PATENT DOCUMENTS 4,171,647 A * 10/1979 Herrgen ........................ 73/854
4,941,363 A * 7/1990 Doemens et al. ............. 73/854
5,585,571 A * 12/1996 Lonsdale et al. ...... 73/862.325

* cited by examiner

*Primary Examiner*—Harshad Patel
(74) *Attorney, Agent, or Firm*—Duane Morris LLP

(57) ABSTRACT

A method and apparatus are described for noncontact measurement of torque applied to a torque-bearing member such as a shaft. The method involves the use of a piezoelectric transducer mechanically coupled to the shaft for rotation therewith, and having electrical characteristics responsive to applied torque. Electrical signal characteristics are changed by the torque-dependent transducer characteristics. The electrical signals are coupled to the outside (non-rotating) world by at least one capacitive coupler. In one embodiment, an fixed-frequency oscillator produces signal, and the transmission of the signal is affected by the torque-dependent resonant frequency of the transducer. In another embodiment, the transducer is coupled in the feedback loop of a circuit to form an oscillator, in which the frequency is responsive to the torque. A transducer may be placed and distributed in a protective holder. The holder may be pierced in particular locations in order to increase or decrease its sensitivity. One transducer is in the form of a monolithic mounting/transducer.

16 Claims, 18 Drawing Sheets

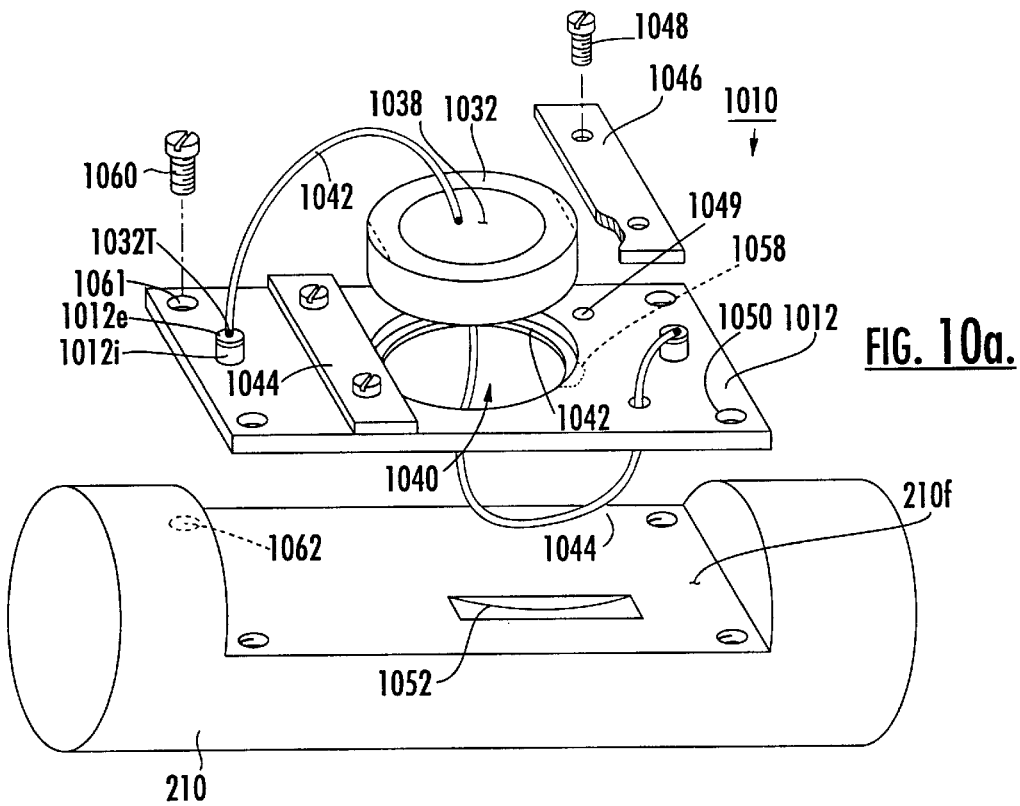
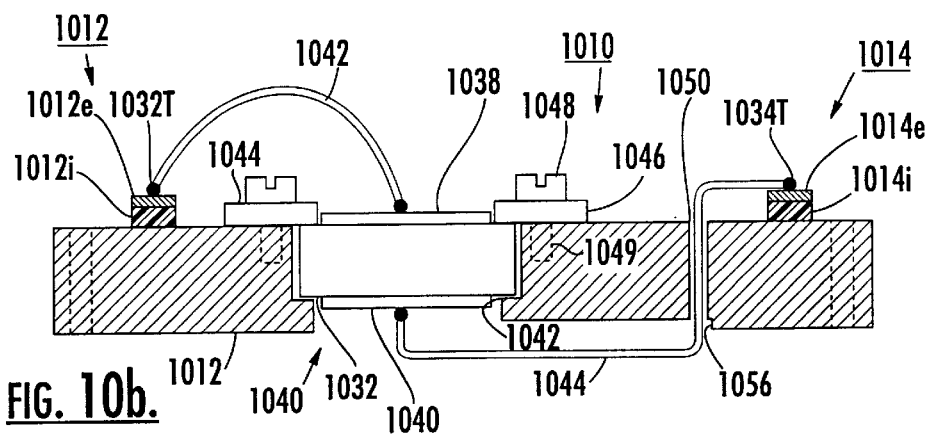
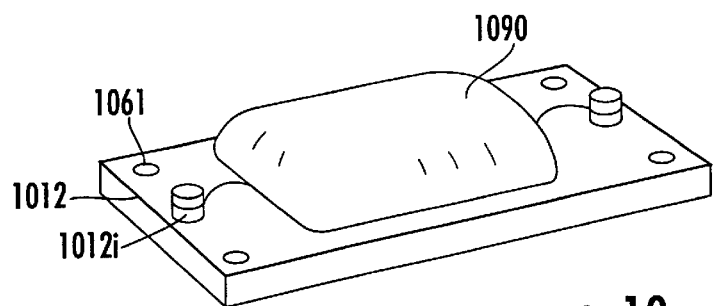

TORQUE MEASURING PIEZOELECTRIC DEVICE AND METHOD

This application claims the benefit of the priority date of Provisional application 60/111,487 filed Dec. 7, 1998.

FIELD OF THE INVENTION

This invention relates to torque measuring devices and methods, and more particularly to noncontacting torque measurements useful for rotating machinery.

BACKGROUND OF THE INVENTION

The Industrial Revolution introduced a vast amount of labor-saving machinery. This machinery, for the most part, involved the use of rotating members such as shafts. Even when reciprocating motions were used, as for example in fabric-weaving looms, the reciprocating motion was derived from the rotational motion of prime movers. Torque can be measured by the use of calibrated levers, which deform in an amount related to the torque applied between the shaft and the lever. However, there is no good way to measure the torque experienced by, or applied to, a rotating shaft. Certainly, a resistive strain gauge or strain sensor could be attached to the rotating shaft, and its resistance could be measured; the problem lies in coupling the electrical parameter to the underlying or non-rotating structure. Slip rings can be used, but introduce so much noise as to make the resulting measurement less useful than it might be. An electronic transmitter could be physically coupled to the shaft and electrically coupled to the strain gauge, but the transmitter needs to be designed to withstand the rotational forces, and a source of electrical energy must accompany the transmitter.

Improved torque sensing arrangements are desired.

SUMMARY OF THE INVENTION

A method is described for measuring the torque to which a torque-bearing member, such as a shaft, is subjected. The torque results in a strain along at least a portion of the length of the torque-bearing member or shaft. The method includes the step of affixing a piezoelectric transducer to the portion of the length of the torque-bearing member. The piezoelectric transducer electrically responds to mechanical strain by producing voltage, current, or charge (voltage); the transducer includes electrodes on which, or in which, the voltage is generated in response to strain. A signal responsive to the voltage is coupled to a signal-measuring instrument, for producing an indication of the magnitude of the signal, and consequently of the magnitude of the torque. In a particular mode of this method, the coupling step includes the step of coupling the voltage to the instrument by way of a capacitive device. A particularly advantageous mode of the invention includes the further step of rotating the torque-bearing member relative to an underlying structure or base. The step of coupling the voltage by way of a capacitive device comprises the step of coupling the voltage by way of (a) a generally annular first electrode coupled to an electrode of the piezoelectric transducer, where the first electrode rotates in consonance with the torque-bearing member, or (b) a generally annular second electrode concentric with the first circular electrode, which second electrode is spaced away from the first electrode by a gap, and is affixed to the underlying structure.

The electrical connections in the abovementioned method are made by the steps of connecting the piezoelectric transducer in circuit with an alternating electrical excitation arrangement so that an alternating voltage is applied across the piezoelectric transducer, upon the completion of which at least a component of the voltage appearing across the transducer is measured to determine the torque. The step of connecting the piezoelectric transducer in circuit may include the step of connecting the transducer in the feedback path of an electrical oscillator. As an alternative, the step of connecting the transducer in circuit may include the step of connecting the transducer to receive at least a portion of the output signal of an electrical oscillator-generator, also known simply as an "oscillator". The affixing step may include the step of affixing to the torque-bearing member a holder carrying the piezoelectric transducer.

In another method according to an aspect of the invention, the torque to which a torque-bearing member is subjected is measured. The torque results in a strain along at least a portion of the length of the torque-bearing member. The method according to this aspect of the invention includes the step of affixing to the appropriate portion of the length of the torque-bearing member a piezoelectric transducer which changes its electrical properties in response to torque, and which includes electrodes for coupling signal between the transducer and other circuits. An alternating electrical signal is coupled through the transducer by way of the electrodes to produce an alternating electrical signal having at least one characteristic which depends upon the torque. At least the characteristic of the alternating electrical signal, as modified by the transducer, is measured, to determine at least one of the magnitude and phase of the torque. The step of affixing in this method may include the step of affixing to the portion of the torque-bearing member a holder which includes the piezoelectric transducer. In one of two alternative embodiments of this method, the step of coupling an alternating electrical signal includes the step of connecting the piezoelectric transducer in the feedback loop of an amplifier, to thereby form or define an oscillator which generates the alternating electrical signal with a frequency which varies in response to the characteristic of the piezoelectric transducer. In the other of the two alternative embodiments, the step of coupling an alternating electrical signal includes the step of connecting the piezoelectric transducer to receive the alternating electrical signal from an oscillator, which may be an external oscillator or oscillator-generator, which operates at a fixed frequency, as a result of which the amplitude of the signal component appearing across the piezoelectric transducer is responsive to the characteristic of the piezoelectric transducer. In this method, the step of measuring may include the further steps of (a) coupling the alternating electrical signal, which has at least one characteristic which depends upon the torque, to a first input port of a mixer, (b) coupling a sample of the alternating electrical signal from the oscillator to a second input port of the mixer, (c) in the mixer, mixing the alternating electrical signal, having at least one characteristic which depends upon the torque, with the sample of the alternating electrical signal from the oscillator, for thereby producing a baseband signal component, and (d) measuring a characteristic of the baseband signal component.

In a particular apparatus according to an aspect of the invention, a piezoelectric transducer arrangement includes a piezoelectric transducer including at least first and second electrical electrodes, and having defining dimensions. A base is included, which has an aperture dimensioned for accepting the piezoelectric transducer, and which further includes a fastening arrangement adapted for fastening the base to a torque-bearing structure. A holding arrangement is mechanically coupled to the base and to the piezoelectric transducer, for holding the transducer in the aperture. A first electrical connection arrangement is mounted on the base. A second electrical connection arrangement is also mounted on the base. A first electrical conductor is coupled to the first electrical electrode and to the first electrical connection arrangement, and a second electrical conductor is coupled to the second electrical electrode and to the second electrical connection arrangement. In a particular embodiment of this arrangement, a protective cover is mounted on the base over the piezoelectric transducer. In one embodiment, the arrangement of the base and transducer is monolithic. In some embodiments, the transducer includes more than two electrodes.

In a particular transducer arrangement, an included electrode structure provides the means for calibration and self-diagnosis protocol of the torque sensor. Specifically, application of external electrical signals by means of dedicated electrodes, andor application of optical signals, a torque or stress of known magnitude is created in the piezoelectric transducer, thereby allowing the sensor to be calibrated andor diagnosed in-situ.

BRIEF DESCRIPTION OF THE DRAWING

FIG. 10a is a simplified perspective or isometric view, partially exploded to expose certain portions, of a piezoelectric transducer holder or mounting arrangement according to an aspect of the invention, together with a portion of the shaft to which it may be mounted, FIG. 10b is a side elevation cross-sectional view of the holder of FIG. 10a, and FIG. 10c is a simplified perspective or isometric view of an arrangement such as that of FIGS. 10a and 10b fitted with a protective lid;

DESCRIPTION OF THE INVENTION

Figure 1:
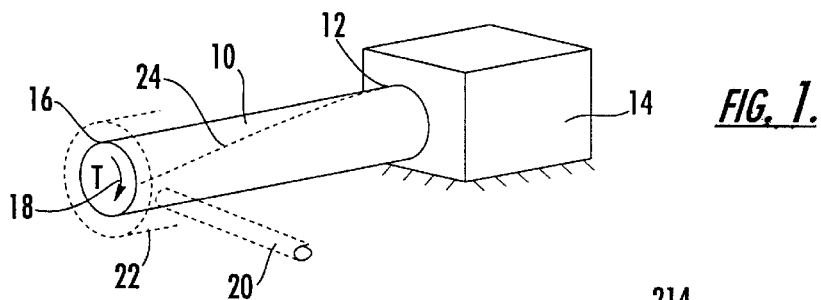
FIG. 1 is a simplified or symbolic, perspective or isometric illustration of a fixed or non-rotating shaft.

FIG. 1 is a simplified diagram illustrating a fixed or non-rotating shaft. In FIG. 1, an elongated shaft having a circular cross-section, affixed a first end 12 to a fixed structure, and free at the other end 16. A torque is illustrated as an arrow 18 and designated T. The torque can be applied by many methods, including application by a lever arm 20 and clamp 22, both illustrated in phantom. Those skilled in the art know that application of a torque as described results in a strain of the shaft 10. The strain resulting from the torque illustrated as arrow 18 will result in a deformation of the shaft 10 which is suggested by the longitudinal dot-dash line 24. In the absence of the torque 18, the dot-dash line 24 would be straight, and run along the top of the shaft, since the end of the shaft 10 which is affixed to structure 14 remains fixed in position.

Figure 2:
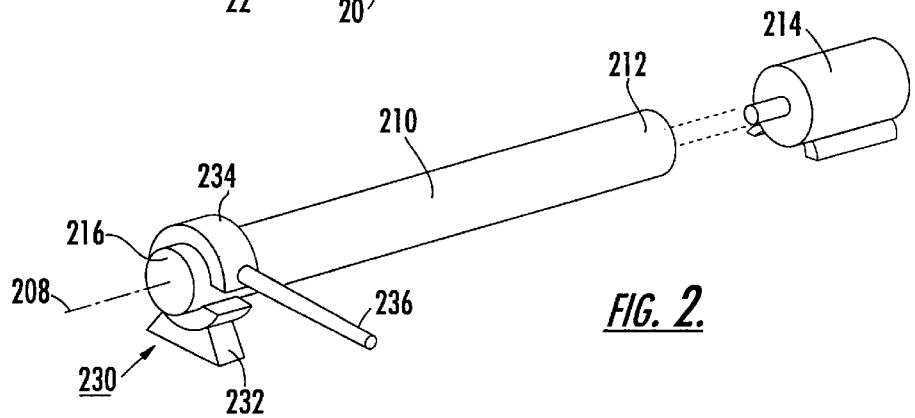
FIG. 2 is a simplified or symbolic, perspective or isometric illustration of a rotating shaft driven at a first end by a motor, and being braked at the other end.

FIG. 2 is a simplified or symbolic illustration of a rotating shaft 210 driven at a first end 212 by a motor 214. Shaft 210 rotates about its axis 208. A second end 216 of shaft 210 is supported by a braking arrangement 230 including a fixed, non-rotating base 232 and a friction-causing brake shoe 234 and lever 236, which changes the force by which friction brake shoe 234 engages the rotating surface of shaft 210. Those skilled in the art know that application of force to lever 236 increases the frictional force tending to brake the motion of shaft 210 imparted by motor 214. If the braking torque exceeds the driving torque available from motor 214, the rotation of the shaft will stop. At braking torques lying between zero and the maximum which the drive motor 214 can produce, the shaft will rotate with rotational velocity which depends upon the characteristics of the motor.

Figure 3A:
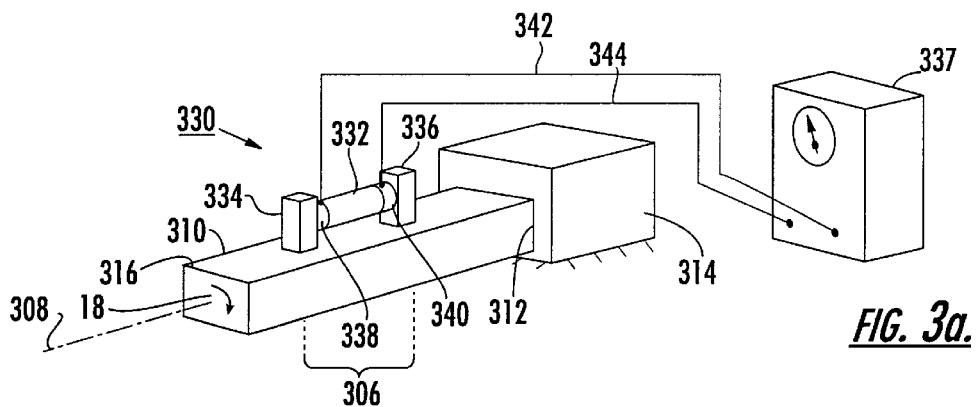
FIG. 3a is a simplified or symbolic, perspective or isometric view of a fixed shaft such as that of FIG. 1, fitted with a piezoelectric transducer according to an aspect of the invention, by which torque can be measured.
Figure 3B:
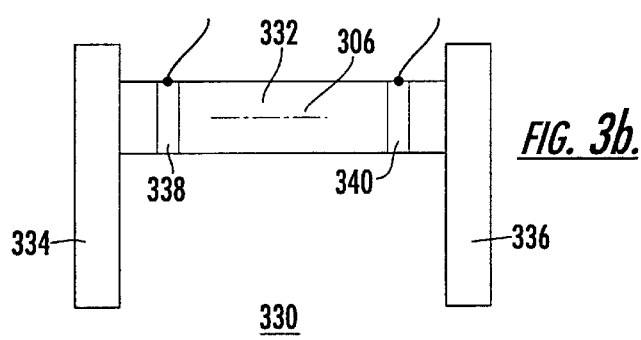
FIG. 3b is a more detailed side elevation view of the transducer of FIG. 3a, and FIG. 3c is a simplified perspective or isometric view of an electrode which may be mounted on the transducer of FIG. 3b.

FIGS. 3a and 3b together illustrate a fixed shaft 310, which happens to have a square cross-section to illustrate the generality of the inventive arrangement and technique, affixed at an end 312 to an underlying fixed structure 314. A second end 316 of shaft 310 is free, and a torque illustrated by an arrow 18 is applied to the free end 316 of shaft 310. As a result of the application of torque 18, shaft 310 experiences strain in the same manner as shaft of FIG. 1. The strain is not illustrated in FIGS. 3a or 3b. In order to measure the strain in accordance with an aspect of the invention, a piezoelectric strain sensor or gauge designated as 330 is affixed along a portion of the length of shaft 310. Piezoelectric strain sensor 330 includes a piezoelectric transducer 332, supported away from shaft 310 by means of two standoffs 334 and 336. The standoffs are not absolutely required, but are illustrated in order to make the invention more clear. Piezoelectric transducer 332 is illustrated as being an elongated rod of circular cross-section, with an axis 306 of elongation lying parallel to the axis 308 of elongation of shaft 310. The shape of the transducer is not critical to operation as a transducer, as further described below, and it may therefore be of any shape. In the context of this invention, the term "voltage" when used to describe the electrical response of the transducer to applied strain, whether that response is in the form of charge, current, or voltage.

Figure 3C:
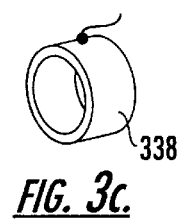

As illustrated in FIGS. 3a, 3b, and 3c, piezoelectric transducer 332 bears or supports a pair of ring-shaped electrodes 338, 340, which allow the voltage generated by the piezoelectric transducer to be sampled, and which also allow bias direct or alternating voltages to be applied to the transducer, as further described below. It should be noted that, while the piezoelectric transducer material has high electrical impedance (acts like a dielectric material), and the supporting standoffs 334 and 336, even if electrically conductive, should not materially affect the operation of the transducer, it may for some dimensions of standoffs and transducers be desirable to make the standoffs of nonconductive materials. As illustrated in FIGS. 3a, 3b, and 3c, electrode 338 is connected by means of an electrical conductor or wire lead 342 to a first terminal of a voltage-sensing or indicating instrument 337, and electrode 340 is connected by means of an electrical conductor or wire lead 344 to a second terminal of instrument 336. Instrument 337 should present a high impedance to the piezoelectric transducer 332, in order to prevent loading of the transducer, which might reduce the indicated voltage. The input impedance of instrument is preferably in the megohm or multiple-megohm range.

In operation of the arrangement of FIGS. 3a, 3b, and 3c, the torque 18 applied to the free end 316 of shaft 310 results in a strain or deformation along the length of the shaft. A portion of the strain is coupled by the standoffs 334 and 336 to piezoelectric transducer 332 in the form of a movement, which in turn causes a strain of the transducer element 332. The strain of the transducer element 332 results in generation of a voltage between or across electrodes 338 and 340. The voltage is coupled to instrument 336, and the magnitude of the voltage is an indication of the amount of strain experienced by shaft 310. The voltage generated by the piezoelectric transducer 332 is, to a first approximation, linearly related to the strain. Second-order effects, however, result in a somewhat nonlinear practical relationship.

Figure 4A:
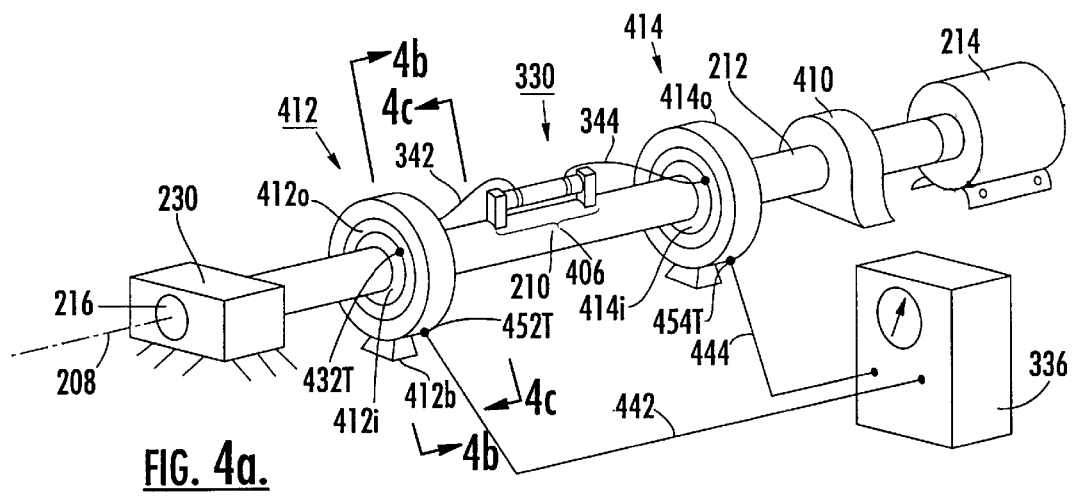
FIG. 4a is a simplified or symbolic representation of a rotating shaft such as that of FIG. 2, fitted with a transducer generally similar to that of FIG. 3b.
Figure 4B:
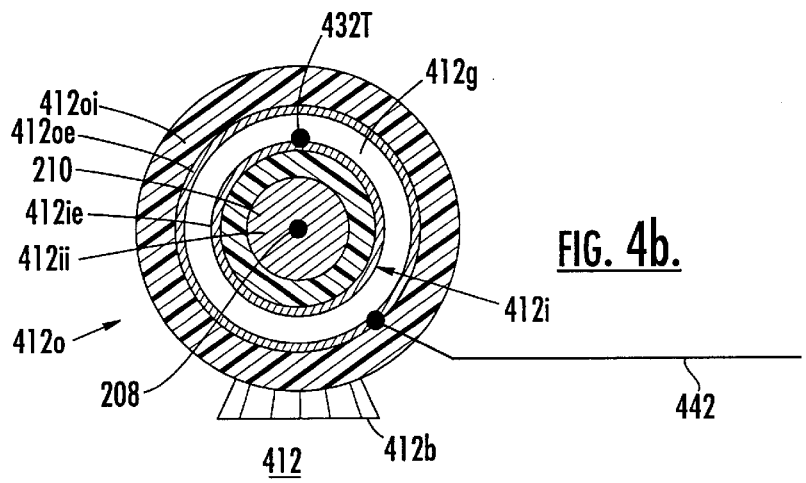
FIG. 4b is a simplified cross-sectional view of the structure of FIG. 4a taken at section lines 4b–4b.

The arrangement of FIGS. 4a and 4b is similar to that of FIG. 2, in that shaft 210 is rotating under the impetus of a motor or engine 214. In the arrangement of FIGS. 4a and 4b, a bearing or bushing 410 supports end 212 of the shaft 210, and the brake device 230 supports end 216.

A piezoelectric transducer 330 is affixed to shaft 210 in FIG. 4a, for rotation therewith. Transducer 330 of FIG. 4a is identical to the transducer of FIG. 3b. Since the shaft 210 is rotating, the electrical conductors or wires which provide electrical connection between the electrodes 338, 340 would simply wind around the shaft 210 if they were connected as in FIG. 3a. To avoid the winding, some other way must be found to provide the desired electrical coupling between the transducer and the instrument 336. In the arrangement of FIG. 4a, a pair of capacitive transducers 412, 414 have annular inner portions 412i and 414i, respectively, which are mechanically coupled to the shaft 210, and corresponding annular outer portions 412o and 414o, respectively, which are fixed in place relative to the underlying structure, such as the base of bearing 410 or of brake 230. The annular outer portions 412o and 414o are concentric with axis 208 of shaft 210, and consequently concentric with annular inner portions 412*i* and 414*i*, respectively. Details of the structure of capacitive transducer 412 are illustrated the cross-section of FIG. 4*b*.

In FIG. 4*b*, rotating shaft 210 is centered on axis 208. Inner portion 412*i* includes an electrically insulating dielectric annulus or disk 412*ii* fixed in position relative to shaft 210 for rotation therewith. An electrically conductive electrode 412*ie* is affixed to the outer periphery of disk 412*ii*. Annular outer portion 412*o* of capacitive coupler 412 is centered on axis 208, and includes an outer electrically insulating or dielectric portion 412*oi*, which bears an electrically conductive electrode 412*oe* on its inner surface. Electrically conductive electrode 412*oe* on the inner surface of the outer dielectric portion 412*oi* faces electrically conductive electrode 412*ie* of the inner portion 412*i* across a gap designated as 412*g*. Outer portion 412*o* is fixed in position relative to the base or underlying structure, as suggested by the symbol designated 412*b*.

Figure 4C:
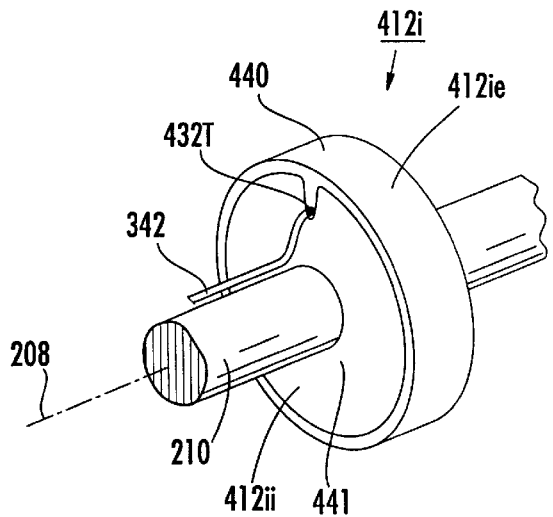
FIG. 4c is a simplified perspective or isometric view, as seen from a viewpoint 4c–4c of FIG. 4a, of a portion of a transducer of FIGS. 4a and 4b fitted with an electrical terminal which lies without the gap of the transducer.

In FIG. 4*a*, a first wire or electrical conductor 342 connects from one of the electrodes of piezoelectric transducer 332 to a connection point 432T on an inner annulus 412*i* of capacitive coupler 412. Similarly, a second wire 344 connects from the other of the electrodes of transducer 332 to a connection point 434T on the inner portion 414*i* of capacitive coupler 414. In FIG. 4*b*, the electrical connection point 432T is illustrated as being on the electrically conductive electrode portion 412*ie* of capacitive coupler 412. As illustrated for simplicity in FIG. 4*b*, point 432T extends into gap 412*g*, but the actual location of the juncture of wire 342 and electrode 412*ie* should not extend into the gap. Instead, the actual connection should be to a portion of the electrode which does not lie within the gap. This portion could be, for example, a conductive tab 440 extending laterally relative to the gap, or extending over a portion of the nonconductive side 441 of the annular inner portion 412*i* of capacitive transducer 412, as illustrated in the view of FIG. 4*c*.

Similarly, a pair of electrical conductors or wires 442 and 444 are connected at terminals illustrated in FIGS. 4*a* and 4*b* as 452T and 454T, respectively, to the electrically conductive electrodes 412*oe* and 414*oe*, respectively. As in the case of the terminals 432T and 434T, the actual location of the connection between the conductors 442, 444 and the electrodes 412*oe* and the corresponding electrode (not illustrated) of coupler 414 does not lie in the gap between inner and outer annular portions of the respective couplers, but rather is placed to one side at a location which does not interfere with relative rotation of the portions. Electrical conductors 442 and 444 are coupled to terminals of electrical sensing instrument 336.

In operation of the transducer of the arrangement of FIG. 4*a* and 4*b*, strain of the shaft 210, due to the torque occasioned by the drive motor 214 and the brake 230, causes a charge or voltage to be generated by transducer 332. The charge or voltage is coupled from transducer 332 by way of conductor 342 to the annular inner electrodes 412*ie* of capacitive coupler 412, and by way of conductor 344 to a corresponding electrode (not illustrated) of capacitive coupler 414. The charge is capacitively coupled across the gaps, in a manner which is sometimes known as a "displacement current," from the inner electrodes (412*ie* and the corresponding electrode of coupler 414) to the outer electrodes (412*oe* and the corresponding electrode of coupler 414), and appears on the outer electrodes. The charge coupled to outer electrode 412*oe* is coupled by way of electrical conductor 442 to a terminal of instrument 336, and the charge coupled to the corresponding outer electrode of coupler 414 is coupled by way of conductor 444 to another terminal of instrument 336.

The strain of a shaft such as shaft 210 of FIGS. 4*a* and 4*b* is ordinarily proportional to the applied stress, which is equivalent in this context to the applied torque. Thus, the strain or rotational displacement ("twisting" of the shaft) in response to torque is, at least to a first approximation, proportional to the torque. The strain or torsional displacement is coupled from the shaft 210 to the piezoelectric transducer 330, which responds in an approximately linear fashion. Thus, the charge or voltage produced by the transducer is approximately proportional to the strain. Since the strain is proportional to the torque, and the charge or voltage is (approximately proportional to the strain, the charge or voltage generated by the transducer is approximately proportional to the applied torque. The reading provided by the indicator of instrument 336, then, is a good indication of the torque experienced by shaft 210.

The capacitive transducers as illustrated in FIGS. 4*a* and 4*b* are very advantageous for the indicated use, because the capacitance, which depends upon the area of the mutually facing inner and outer electrodes (412*ie* and 412*oe*, for example) and upon their spacing. Capacitance tends to increase with a larger facing area, together with a small spacing between the electrodes (corresponding to a small gap 412*g*). The architecture of the capacitive transducers tends to provide a large facing area and permits a small gap, so that the capacitance may be maximized. Large capacitance is advantageous in that it tends to maximize the coupling between the transducer 330 and the instrument 336.

The gap 412*g* of capacitive coupler 412 and the corresponding gap of capacitive coupler 414 are conductively discontinuous, as a result of which there is no direct or galvanic connection between the piezoelectric transducer 332 and the terminals of instrument 336. Since there is no direct or galvanic connection between the electrodes of the transducer and the terminals of instrument 336, a direct voltage cannot be sustained indefinitely at the instrument, but rather a voltage, due to a torque and the resulting strain, will decay with a time constant established by the magnitude of the capacitances of the capacitive couplers and the resistance of the input impedance of the instrument (and stray capacitances and resistances) as known in the art. In practical systems, the time constant of the decay may be measured in minutes rather than in hours, so the indication is only temporary. This time constant is suitable for some measurements, such as measurements of transient changes in the torque loading or rapidly changing torques. However, for some applications it may be necessary to periodically renew the reading, in which case the capacitors of the capacitive couplers must be discharged, and the piezoelectric transducer must be reset to a non-strained condition, both of which require stopping the rotation of the shaft. This type of operation is often called a "passive" mode, and hence the transducer in this mode is known as a passive transducer. For some types of measurements requiring long duration measurements, the arrangement of FIGS. 4*a* and 4*b* may not be as useful as desired.

Figure 5:
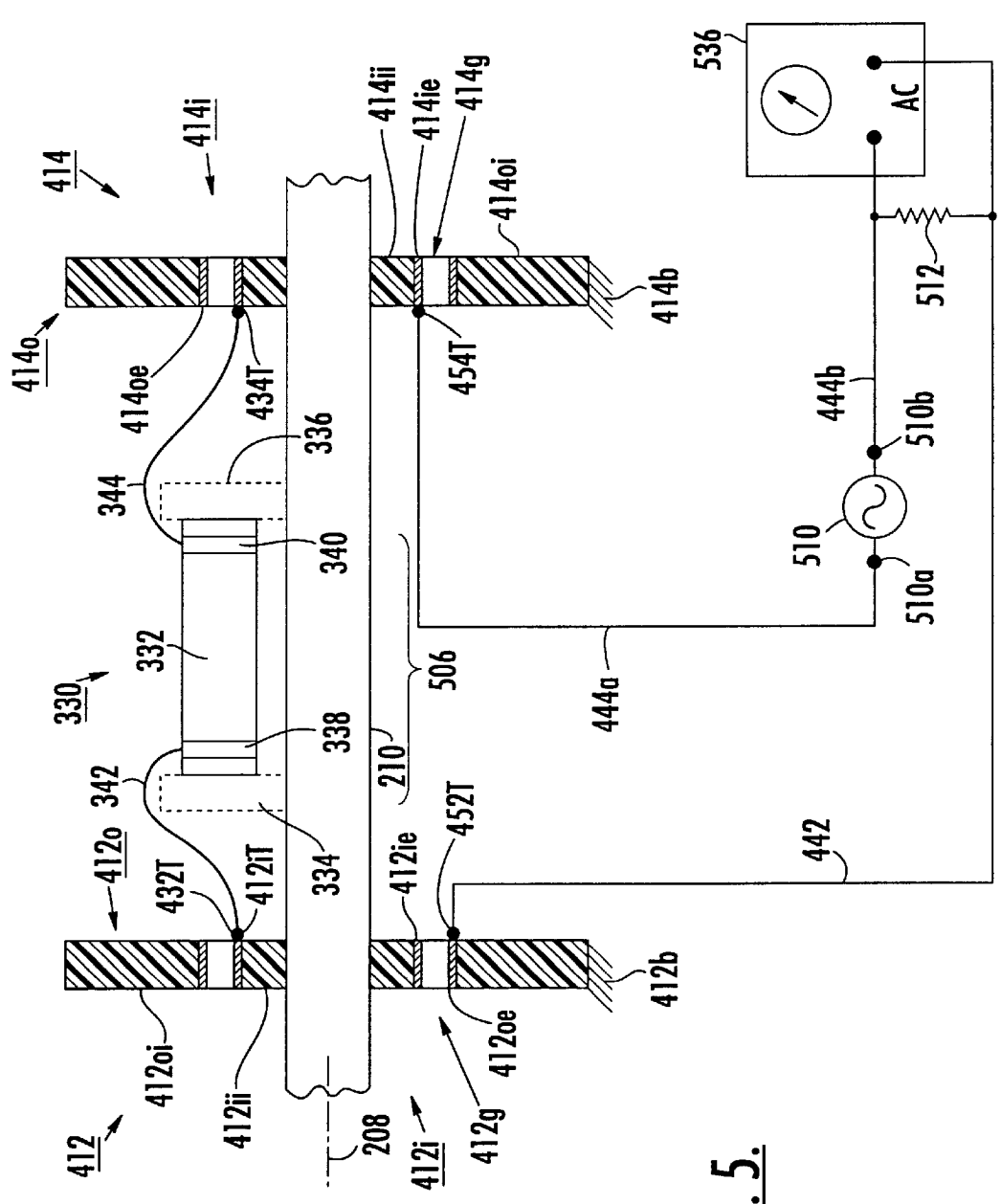
FIG. 5 is a simplified or symbolic representation of a structure similar to that of FIGS. 4a and 4b, including an electrical oscillator or oscillator-generator coupled in-circuit with the transducer.

According to a further aspect of the invention, an alternating electrical signal is applied to the piezoelectric transducer; such an electrical signal may be viewed as being either a voltage or a current; this type of operation is known as an "active" mode of operation, and the transducer in this mode is an active transducer. FIG. 5 is a simplified representation of the shaft, transducer, and capacitive coupler arrangement of FIGS. 4*a* and 4*b*, modified by inclusion of an oscillator-generator. In FIG. 5, electrical conductor 444 has been split into two portions, namely 444a and 444b, and the signal measuring instrument is designated 536, to distinguish it from the instrument of FIG. 3a. Instrument 536 is an alternating-current measuring instrument, rather than a direct-voltage or charge-measuring instrument as in FIG. 3a. The terminals 510a and 510b of an electrical oscillator-generator 510 are connected to electrical conductors 444a and 444b, respectively, so that a galvanic connection is made between oscillator-generator terminal 510b and a first terminal of instrument 536, and a galvanic connection is made between oscillator-generator terminal 510a and terminal 454T. A resistor or other element 512 is coupled across the terminals of instrument 536. The impedance of the element 512 is selected to be low relative to the input impedance of instrument 536. With these connections, the alternating signal generated by oscillator 510 may be viewed as being coupled from terminal 510a, through conductor 444a to terminal 454T on electrode 414oe, across the gap 414g to electrode 414ie and terminal 434T, by way of conductor 344 and electrode 340 to the piezoelectric transducer element 332, through the transducer element 332 to electrode 338, conductor 342, terminal 432T and electrode 412ie, across the gap 412g to electrode 412oe and terminal 452T, through conductor 442 to element 512, through element 512 and conductor 444b, and back to terminal 510b of oscillator-generator 510. With this connection, the oscillator-generator signal flows through the piezoelectric transducer, and its flow is affected by the characteristics of the transducer. It should be noted that an oscillator-generator such as 510 of FIG. 5 is often known simply as an "oscillator," and such language may be used hereinbelow.

Figures 6A, 6B:
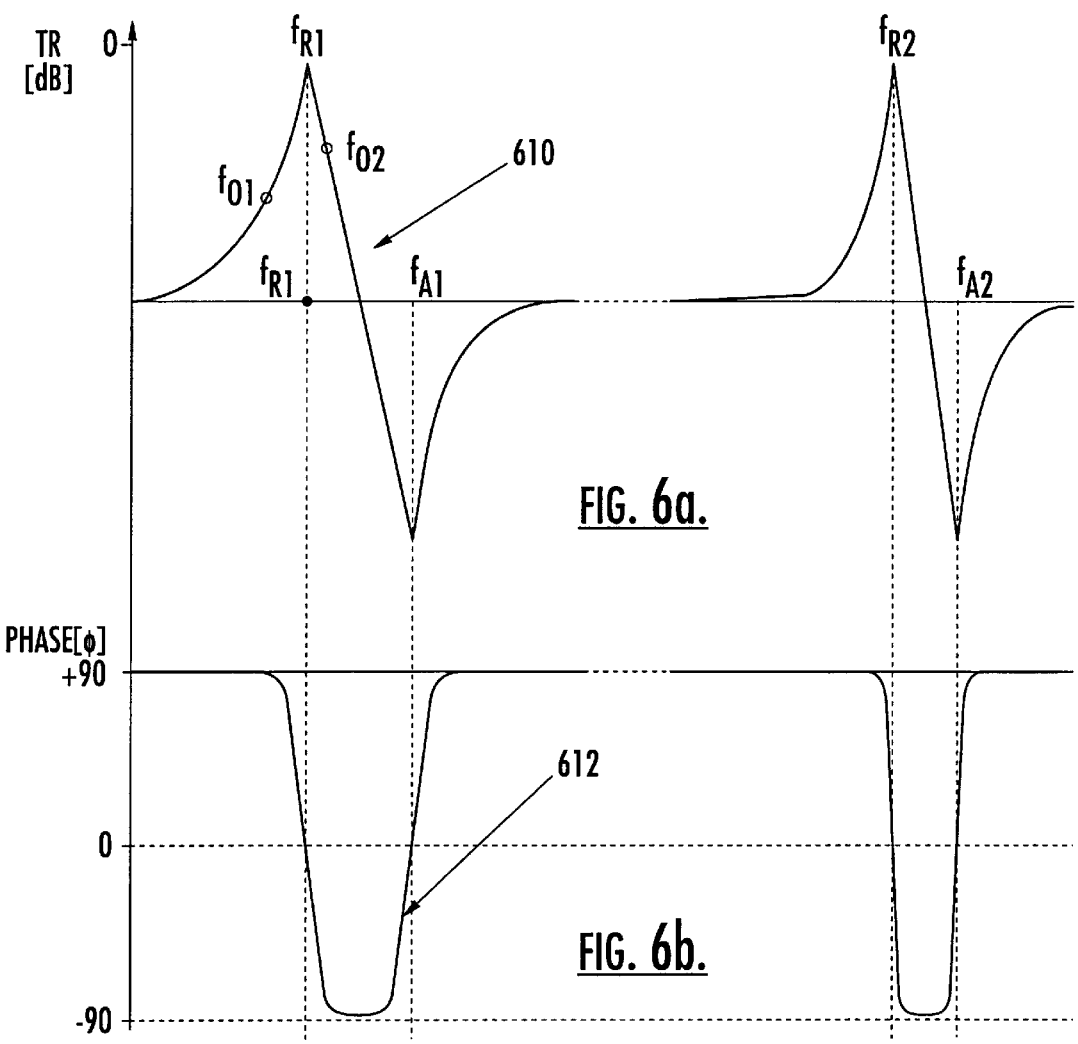
FIG. 6a illustrates a plot of the amplitude of the transfer function of the piezoelectric transducer of FIG. 5 as a function of frequency.
FIG. 6b is a corresponding plot of the phase.

FIG. 6a is a plot 610 of the amplitude, and plot 612 of FIG. 6b of the phase, of the transfer function (TF) of the piezoelectric transducer of FIG. 5 as a function of frequency, illustrating the fundamental resonance at $f_{R1}$ and the first harmonic or overtone harmonic resonance $f_{R2}$ at a frequency of approximately three times $f_{R1}$. Theoretically, there are an infinite number of these odd overtone frequencies. The overtones are important, because they can be used to design torque sensors having higher sensitivity than those operating at the fundamental frequency. In addition, by comparison of two overtone responses, the influence of a variety of environmental effects on the torque sensors can be ameliorated or eliminated. It must be realized that the plots 610 and 612 are somewhat generic, because they represent qualitatively the frequency characteristics of the impedance and admittance of the sensor. The transfer function can be used as a guide to sensor analysis and design as well as the impedance and admittance.

According to an aspect of the invention, the frequency of operation or oscillation of alternating source 510 of FIG. 5 is selected to be at a frequency which is on a slope of the amplitude transfer function plot 610 (FIG. 6a) of the transducer. More particularly, the frequency of operation of the oscillator is selected to be at a frequency $f_{o2}$, illustrated as being on the higher slope of the plot 610 in the vicinity of frequency $f_{R1}$. Operation could also occur, with less sensitivity (change of amplitude per unit change of frequency) at frequencies, such as frequency $f_{o1}$, which lie on the lower slope of the resonance curve. According to another aspect of the invention, the frequency of operation of oscillator 510 could be at a frequency near $f_{R2}$, the second harmonic or overtone resonance frequency. While higher harmonic resonances (higher, that is, than $f_{R2}$) are not illustrated in FIG. 6, operation could also occur at frequencies near the higher-order resonance frequencies, with the advantage of operation at the higher harmonics being more change in amplitude for a given change in frequency.

Figure 7A:
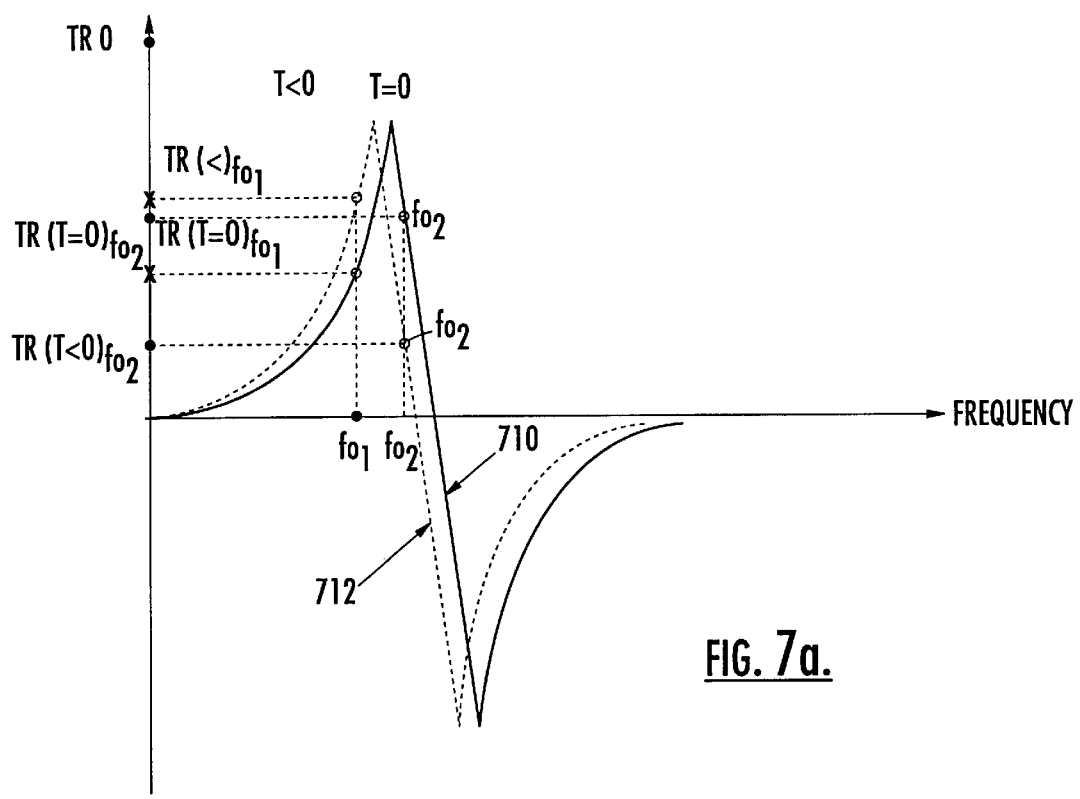
FIG. 7a illustrates plots of the amplitude of the transfer function of the piezoelectric transducer of FIG. 5 at the fundamental resonance, plotted against frequency, with torque as a parameter.
Figure 7B:
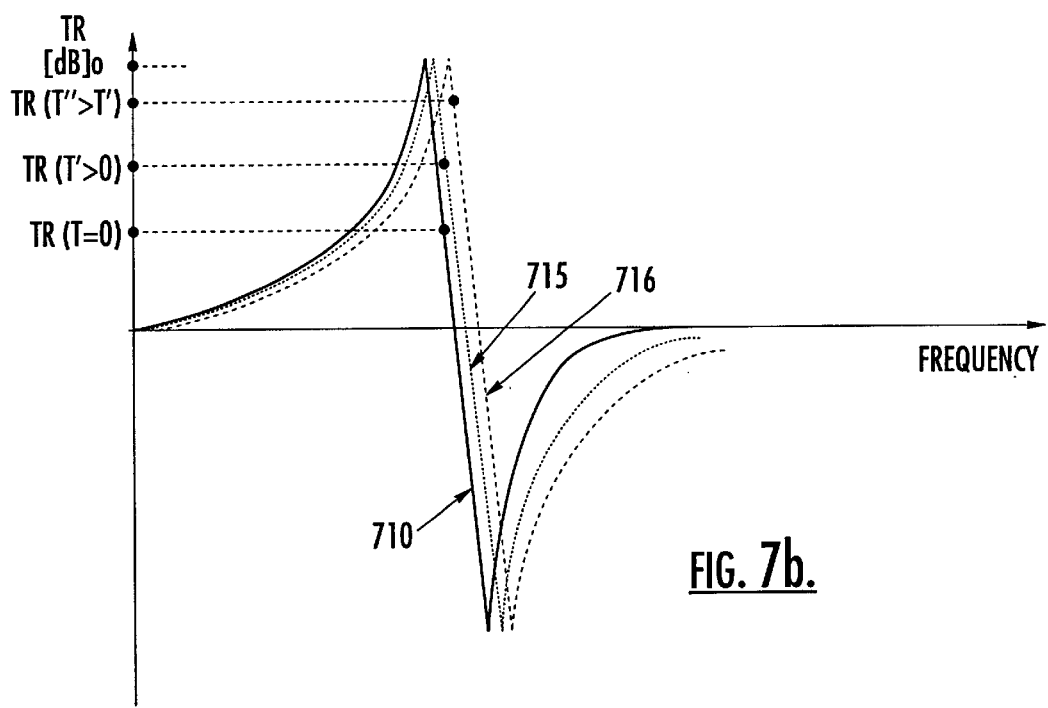
FIG. 7b is a corresponding plot for phase.

Thus, in the arrangement of FIG. 5, the oscillator 510 operates at a frequency which is near the fundamental frequency or a harmonic frequency of the unstrained piezoelectric transducer 332. At such frequencies, the transfer function of the piezoelectric element 332 is relatively high, and most of the alternating voltage generated by the oscillator is developed, or appears (or is "dropped," in the parlance of electrical workers), or is transmitted across the piezoelectric element. Thus, the RF signal is transmitted with minimum loss at and around the resonant frequency, as the impedance is almost zero, and the admittance is at a maximum. Consequently, a relatively large alternating voltage appears across the impedance element 512 and across the terminals of instrument 536. When a torque is applied to shaft 210 of FIG. 5, the resulting strain or physical displacement is coupled to the piezoelectric transducer 332, which responds by changing its electrical resonant frequency. This change in electrical resonant frequency results from the changes in propagation velocity within the piezoelectric transducer, and also from the changes in the shape of the transducer, attributable to the physical strain. FIG. 7b illustrates plots 710, 712, 714, and 716 of the amplitude of the transfer function at the fundamental resonance of the piezoelectric transducer of FIG. 5, plotted against frequency, for various different torque values. In general, the magnitude of the change of the resonance frequency tends to increase with increasing torque. More particularly, in FIG. 7a, solid-line plot 710 represents the resonance at zero strain or torque, and dash-line plot 712 represents the resonance at a strain or torque in one direction. In FIG. 7b, solid-line plot 710' represents the resonance at zero strain or torque, and dotline plot 714 represents a strain or torque in the direction opposite to that of FIG. 7a. Double-dot-dash line plot 716 represents a greater torque and strain in the same direction as that for plot 714. It should be noted that the changes or frequency shifts of the transfer function and resonant frequencies as depicted are exaggerated, and the actual changes are relatively slight. When the oscillator operates at a fixed frequency, such as frequency $f_{o2}$ in FIG. 7a, the transfer function exhibited by the transducer at frequency $f_{o2}$ decreases with increasing strain, as a result of which that portion of the alternating signal generated by generator 510 at frequency $f_{o2}$ which appears (or is dropped) across the transducer decreases, and the portion of the generator signal which appears across the terminals of instrument 536 of FIG. 5 increases, in approximate proportion to the strain, and therefore in corresponding proportion to the shaft torque.

Figure 8:
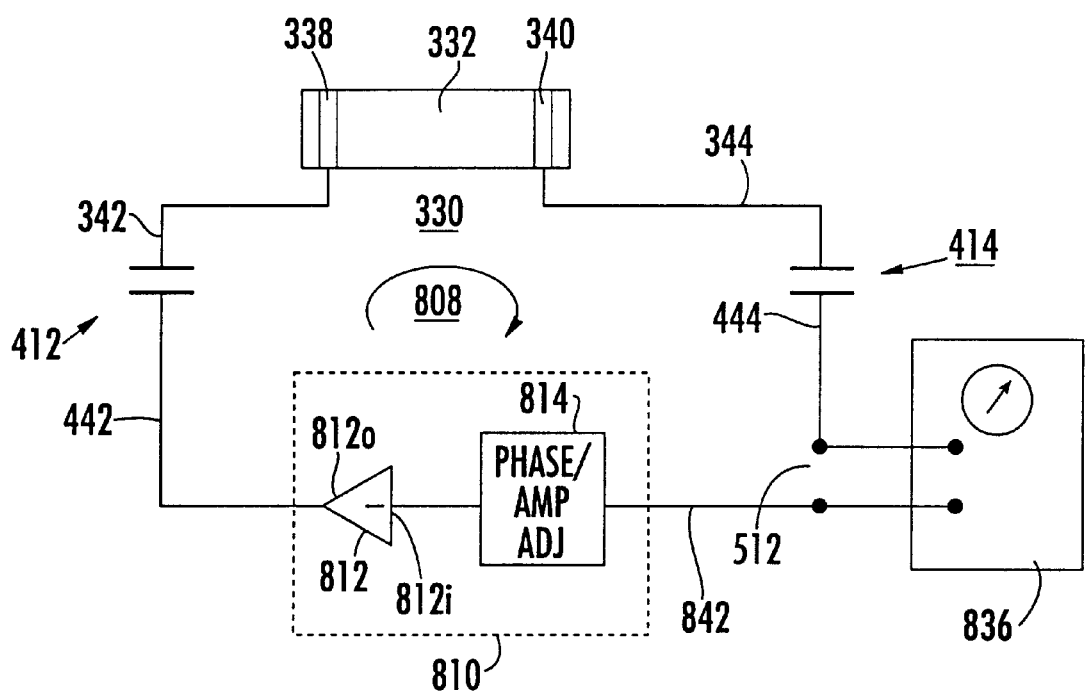
FIG. 8 is a simplified diagram, substantially in conventional electrical "schematic" diagram form, of another embodiment of the invention, in which the torque is determined by measuring the frequency of operation of an oscillator which includes the piezoelectric transducer within its feedback loop.

As described above, the arrangement of FIG. 5 includes a piezoelectric transducer which is coupled in-circuit with a discrete oscillator, which is illustrated as a block 510. Thus, the oscillator sets the frequency of operation of the electrical portion of the circuit. FIG. 8 is a simplified or conceptual diagram of an arrangement according to an aspect of the invention, in which the piezoelectric transducer 330 is included within the regenerative feedback loop of an electrical oscillator circuit, so that the piezoelectric transducer aids in establishing the frequency of electrical oscillation, and therefore the electrical operating frequency. It should be noted that the symbols used in FIG. 8 are more generic than those used in FIG. 5, to thereby bring the form of the illustration more into congruence with conventional electrical "schematic" diagram conventions. In FIG. 8, the transducer 330 continues to be illustrated as a piezoelectric rod 332 (even though it may have any of a number of shapes, including the shape of a disk) having electrically conductive electrodes 338 and 340. The annular capacitive coupling devices are illustrated by a capacitor symbols 412 and 414. The discrete oscillator-generator 510 does not appear in FIG. 8. Instead, a block designated 810 includes an amplifier illustrated as 812, coupled to a phase andor amplitude adjustment block 814. The amplifier 812 provides the amplification in a feedback loop 808 beginning at the amplifier output port 812o, which feedback path includes electrically conductive path or conductor 442, capacitor 412, electrically conductive path 342, piezoelectric transducer 330, electrically conductive path 342, capacitor 414, electrically conductive path 444, a path extending between the input terminals of instrument 836 (which may be bridged by an impedance element 512, illustrated in phantom), an electrically conductive path 842, and a block 814 (if needed), back to the input port 812i of amplifier 812. Those skilled in the art will recognize the path as a feedback path, which can be made either degenerative or regenerative by selection of the parameters or characteristics of the feedback path. In the particular arrangement of FIG. 8, an oscillator is desired, so the feedback path 808 must be regenerative. In order to be regenerative, the path 808 must have particular values of phase and overall amplitude response, well known to those skilled in the art. For this purpose, the amplifier is illustrated (by a "minus" symbol or sign) as being an inverting amplifier, which to a first approximation provides the requisite phase shift. The remainder of the phase shift, and the amplitude adjustment (if needed) is provided by the feedback path as a whole, and may be trimmed or adjusted by block 814 to provide oscillation at the desired frequency.

The operation of the arrangement of FIG. 8 differs in a subtle manner from that of FIG. 5. More particularly, the arrangement of FIG. 5, having a discrete oscillator, has its frequency established by the oscillator itself, rather than by the characteristics of a feedback path including the piezoelectric transducer. Thus, the arrangement of FIG. 5 operates at a fixed frequency, and measures torque by detecting (with instrument 536) the change in amplitude of the fixed-frequency signal in response to the changing frequency characteristic of the piezoelectric transducer. By contrast, the arrangement of FIG. 8 operates at a variable frequency, in which the frequency of operation depends upon the characteristics of the piezoelectric transducer, and the magnitude of the torque is determined by examining (using instrument 836) the frequency of operation. Thus, the instrument of FIG. 5 should be capable of measuring amplitude at a given frequency, whereas the instrument of FIG. 8 should be capable of measuring the operating frequency itself. One may say that, in the arrangement of FIG. 5, the choice of the fixed operating frequency can significantly affect the response of the torque sensor.

Figures 9A, 9B:
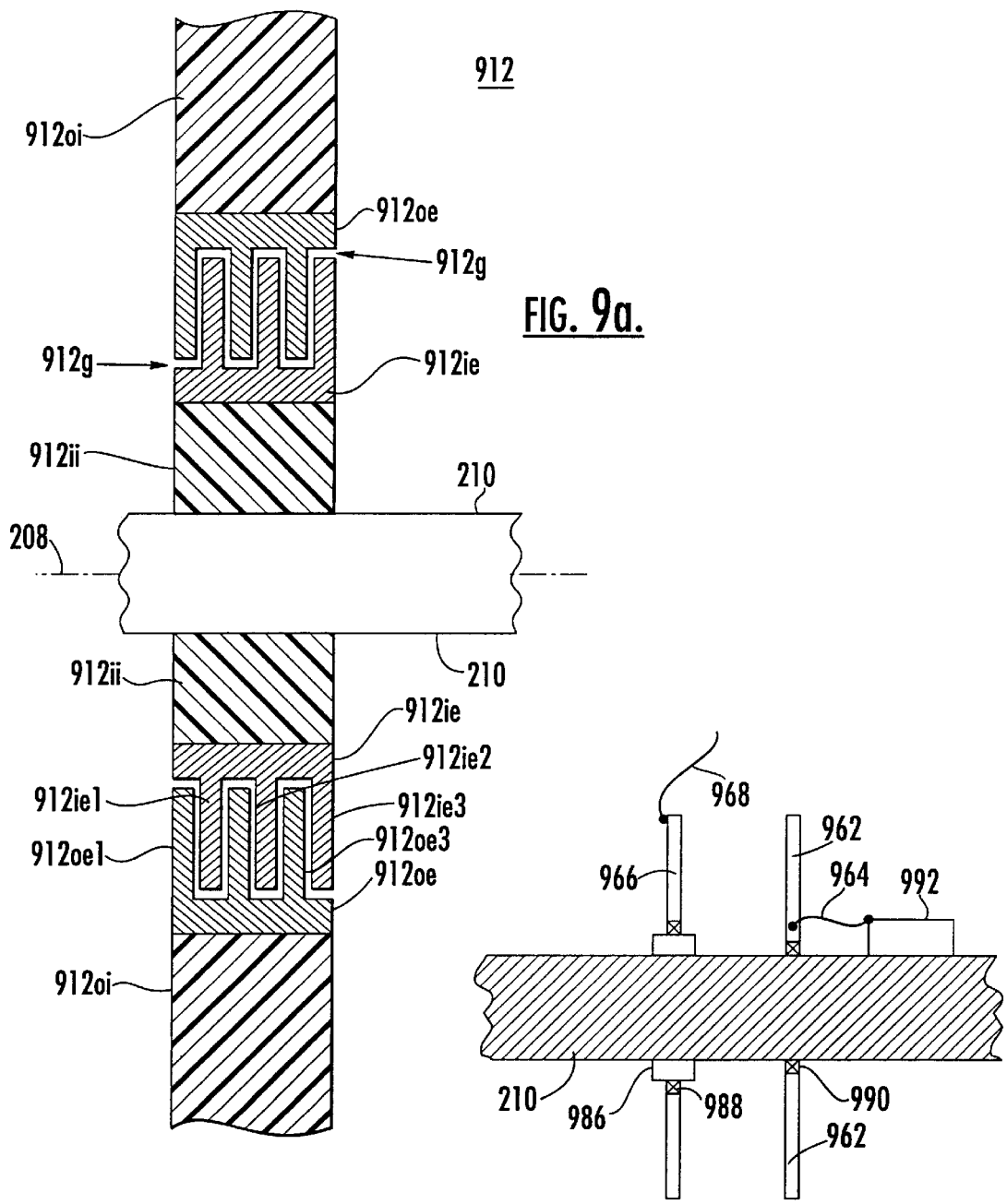
FIG. 9a is a simplified cross-sectional diagram illustrating another form of capacitive coupler which may be used in the arrangement of FIG. 4 to provide voltage coupling to a moving shaft.
FIG. 9b is a simplified representation of another embodiment of a capacitive transducer in which the coupling plates are principally parallel.

In FIG. 9a, the capacitive coupler 912 provides more capacitance than coupler 412, because the facing area of the electrically conductive electrodes is enhanced. More particularly, in FIG. 9a, the shaft 210 carries an inner electrically nonconductive or dielectric material in the form of an annulus 912ii. An electrically conductive electrode 912ie in the form of a set of projecting vanes or "teeth," some of which are designated 912ie1, 912ie2, and 912ie3, is affixed to the outer periphery of annular dielectric 912ii, and rotates with the shaft 210. The stator or fixed portion of the capacitive coupler 912 includes the annular outer electrical insulator or dielectric material 912oi, which bears an electrically conductive electrode 912oe on the surface facing electrode 912ie. Fixed electrode 912oe also includes a plurality of electrically conductive vanes or "teeth", some of which are designated 912oe1 and 912oe3. Understanding that FIG. 9a is a cross-sectional view of a structure which is principally circularly symmetric about axis 208, it will be clear that the electrically conductive vanes remain separated by a tortuous gap 912g as the shaft and the inner annular electrode revolve about axis 208. Thus, they never come into actual contact, and remain spaced apart by the gap dimensions. The function provided by an arrangement 912 such as that of FIG. 9a is identical to that provided by the arrangement 412 of FIG. 4, but the magnitude of the capacitance may be greater for a given shaft length.

In general, the capacitive coupling surfaces or electrodes can be of an arbitrary shape or geometry, so long as the surfaces "overlap" and are sufficiently close to provide the requisite coupling. In FIG. 9b, shaft 210 bears an electrode plate 962 which is electrically insulated from the shaft 210 by means of an insulator ring 990. An electrical connection 964 makes contact between electrode plate 962 and an electrical device, such as a transducer, illustrated as a block 992. Electrode plate 962 rotates with the shaft 210. Another electrode plate 966 is fixed, and electrically insulated by an insulator ring 988 from a bearing 986, which allows rotation of the shaft while the electrode 966 remains in a fixed position. An electrical connection 968 connects the fixed electrode 966 to other circuits (not illustrated in FIG. 9b).

FIG. 10a is a simplified perspective or isometric view, partially exploded to expose certain portions, of a piezoelectric transducer holder or mounting arrangement according to an aspect of the invention, together with a portion of the shaft to which it may be mounted, and FIG. 10b is a side elevation cross-sectional view of the holder of FIG. 10a. The purpose of the holder arrangement is to protect the piezoelectric element, which may be soft or brittle, during handling, to make it easy for unskilled personnel to install torque sensors in various pieces of machinery or devices, as might be the situation in a factory in which such sensors are installed on the axles of a vehicle as part of a traction or braking control arrangement. In particular, one of the desirable piezoelectric materials, namely quartz, is brittle. In FIGS. 10a and 10b, shaft portion 210 defines a flat portion 210f. A piezoelectric mounting arrangement designated generally as 1010 includes a baseplate 1012 defining a through aperture 1040 shaped to hold the piezoelectric element 1032. As illustrated in FIGS. 10a and 10b, the piezoelectric element 1032 is disk-like or circular in shape, and has upper and lower electrically conductive electrodes 1038 and 1040. A shoulder or lip 1042 defines an aperture portion which is smaller than the piezoelectric element 1032, so that the element can sit on the shoulder 1042. A pair of holders or clamp elements is illustrated as 1044 and 1046, which extend across an edge portion of the piezoelectric element 1032, and are held in place by screws, one of which is designated 1048, extending into threaded apertures such as 1049, to thereby hold the piezoelectric element in place in holder base 1012. As illustrated in FIG. 10, two electrically conductive pads 1012e and 1014e are supported above the body 1012 by nonconductive standoffs 1012i and 1014i, respectively. The electrically conductive pads are provided so that the electrical connections of the piezoelectric element to the capacitive couplers (if used) or other external circuitry does not involve soldering of conductor wires to the electrically conductive electrodes 1032, 1034 of the piezoelectric element itself. The holder 1010 is shipped to the user with the piezoelectric element electrodes connected to the electrically conductive pads. More particularly, upper electrode 1038 is connected by a wire 1042 to the pad 1012e, and lower electrode 1040 is connected by a wire 1044 to a pad 1014e. As illustrated in FIG. 10, wire connection 1042 can extend in a direct path over the upper surface of the mounting from electrode 1032 to pad 1012e. There is no direct path available between lower electrode 1040 and pad 1014e. Consequently, some aperture must be made available for the passage of wire 1044. As illustrated in FIG. 10a, a through aperture 1050 provides a communication path between the top and bottom of holder 1010 for wire 1044, so the attachment can be made. Some clearance must be provided for the presence of wire 1044. The clearance may be provided by a depression 1052 made in flat 210f, or by a notch 1056 made in the lower surface of body 1012 of holder 1010. As an alternative to aperture 1050 and a clearance notch or gap, a notch in the edge of aperture 1040 may be used. Such a notch is suggested by dotted outline 1058. Mounting arrangement 1010 is held in place in flat 210f by means of screws, one of which is illustrated as 1060, which pass through clearance apertures 1061 in body 1012 and into threaded apertures, one of which is illustrated as 1062. Alternatively, all these electrical connections can be made using circuit printing techniques, or by deposition of electrical paths on the surface of the holder. In any case, if the holder is made from an electrically conductive material, it is necessary to first place an electrically insulating material on the holder surface.

The aperture 1040 has been described as a through aperture, but may advantageously have a closed bottom, especially if the notch 1058 arrangement is used, so that the bottom of the piezoelectric element 1032 is protected by the solid-bottom baseplate 1012. This arrangement, in conjunction with a protective cover 1090 as illustrated in FIG. 10c, makes a rugged transducer which may be used in many applications.

Figure 11A:
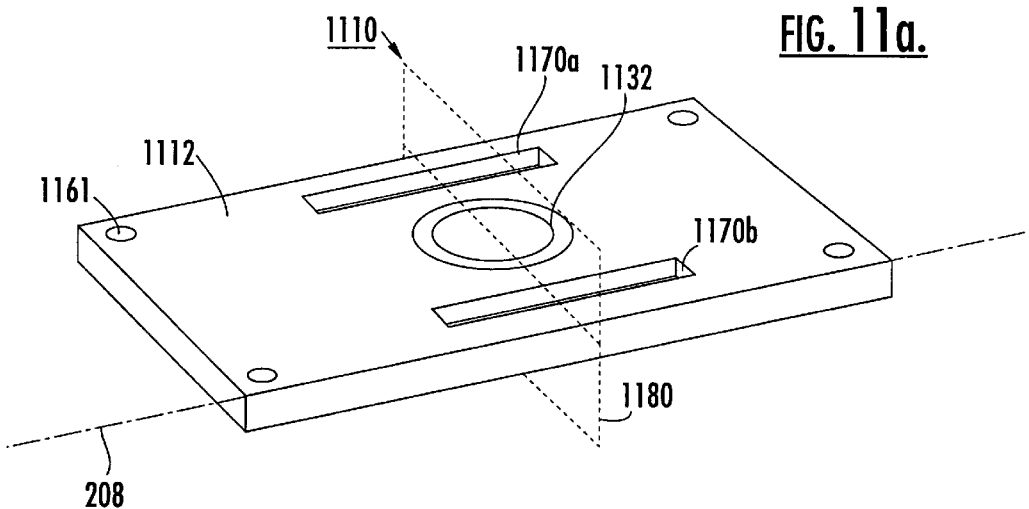
FIG. 11a is a simplified diagram of a mounting arrangement generally similar to that of FIGS. 10a and 10b, showing piercing of the base to increase sensitivity of the piezoelectric transducer to torques and possibly for decreasing the sensitivity to shaft spurious or bending stresses.
Figure 11B:
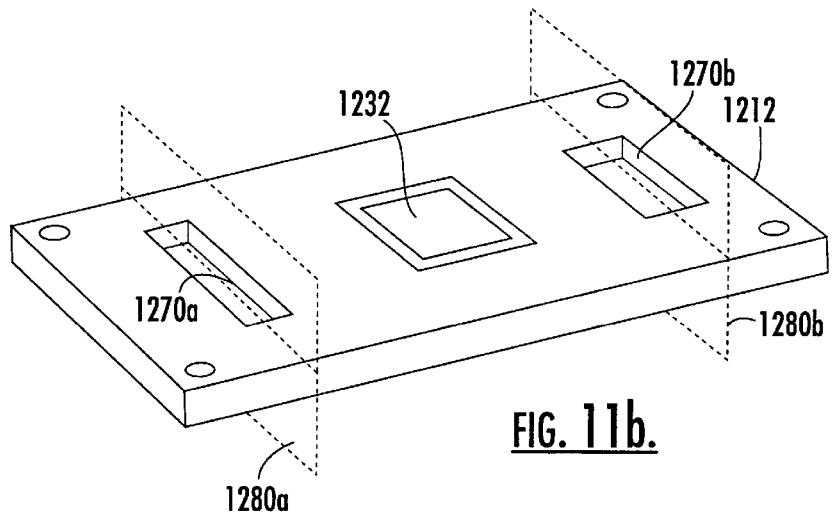
FIG. 11b is a simplified diagram of a mounting arrangement generally similar to that of FIGS. 10a and 10b, showing piercing of the base to decrease sensitivity of the piezoelectric transducer.

One problem with the mounting arrangement illustrated in conjunction with FIG. 10 is that the presence of body 1012 of mounting 1010 tends to reduce the sensitivity of the piezoelectric element to strain, because the mounting tends to resist the torque-induced forces. According to an aspect of the invention, the body of the mounting plate is pierced to change the sensitivity of the piezoelectric element to torque-induced stress or to change the sensitivity to spurious (incidental or unwanted) bending. FIG. 11a is a simplified diagram of a mounting plate or body 1112 of a mounting arrangement 1110. Mounting arrangement 1110 includes a piezoelectric element 1132, also in the form of a disk, which occupies a corresponding aperture in the body 1112, and is held in place by means which are not illustrated. As illustrated in FIG. 11a, body 1112 is pierced by a pair of apertures 1170a and 1170b, which essentially weaken the holder, and prevent the material of the entire width of the body 1012 of the holder 1010 from paralleling the piezoelectric element from the point of view of mechanical coupling. Put another way, the holder is weakened in a plane 1180 which is orthogonal to the axis (208) about which the torque is applied, so that more of the torque-induced strain is coupled to the piezoelectric element 1132, instead of being transferred by way of body 1112. This, in turn, tends to increase the sensitivity of the transducer/holder relative to the unpierced condition. FIG. 11b illustrates a similar use of piercing of the body 1212 of a holder 1210 in a manner which tends to reduce the sensitivity of the transducer/holder. In FIG. 11b, the piercing produces two apertures 1270a and 1270b, which weaken the body 1212 in parallel planes 1280a and 1280b, which planes are orthogonal to the axis 208 about which the torque is applied. It should be emphasized that the weakening may be made by a plurality of apertures lying "in the plane" rather than by a single elongated aperture, as illustrated, lying in the plane. The quotation marks are intended to signify that it is theoretically not possible to have an aperture coincident with a plane, because a plane has no transverse dimensions. Those skilled in the art, however, will understand that the apertures may be of any sort which weakens the body in the particular plane referred to, even though they may extend on either side of the plane. The piezoelectric transducer 1232 of FIG. 11b is illustrated as being square in outline, to thereby emphasize that the shape of the transducer is not critical to the invention. Also, the shapes and positions of the piercings of the body of the sensor mounting may be of various shapes, sizes, locations, and number.

Figure 12:
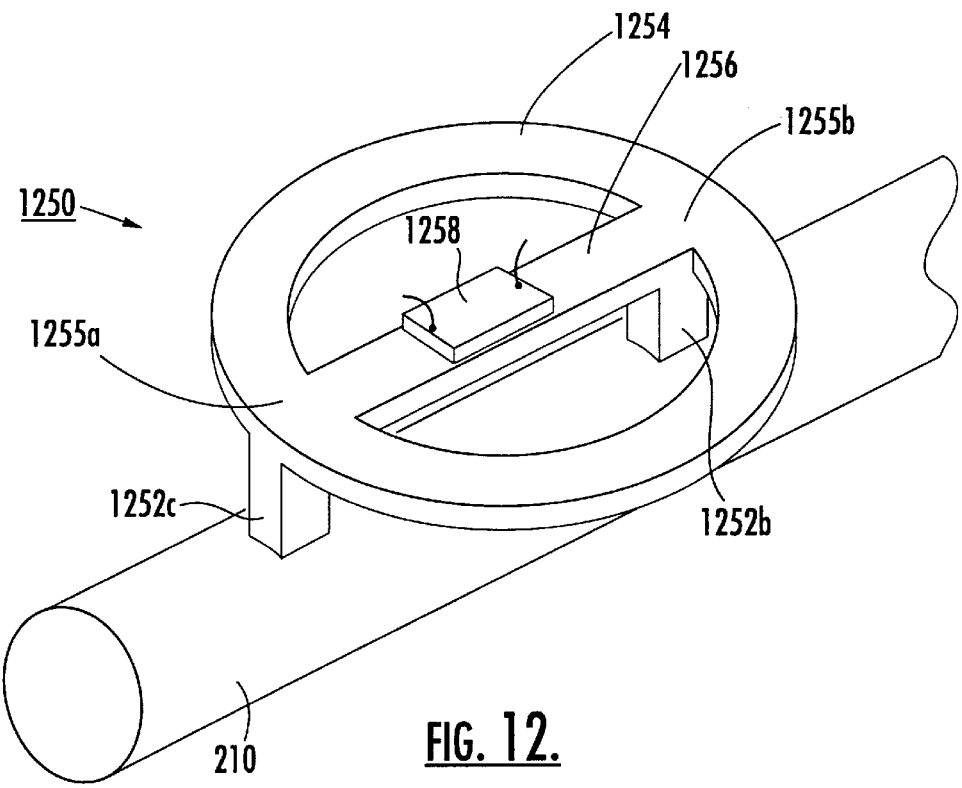
FIG. 12 is a simplified perspective or isometric view of a transducer with apertures equivalent to some of those illustrated in FIGS. 11a and 11b.

In FIG. 12, a shaft 210 bears a structure 1250 which includes a ring 1254 of plastic, metal, composite, or other material, with a diametric element 1256 lying parallel with the shaft. The junctures 1255a and 1255b of the ring 1254 with the diametric element 1256 are supported by a pair of standoffs or legs 1252a and 1252b, respectively. The piezoelectric transducer 1258 is mounted on the diametric element 1256.

Figure 13:
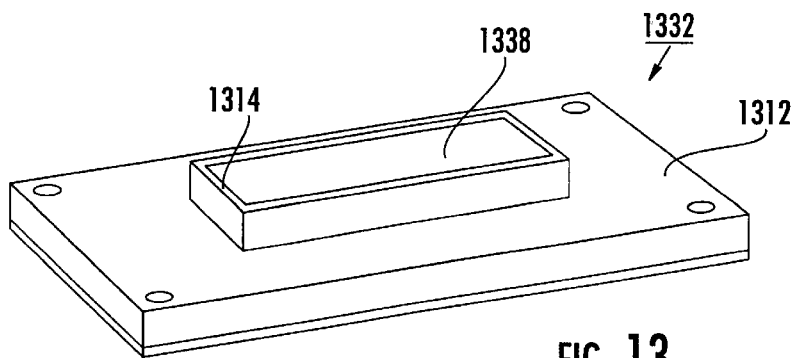
FIG. 13 is a simplified diagram of a monolithic piezoelectric transducer/mounting arrangement.

In FIG. 13, the piezoelectric transducer and mounting arrangement 1332 are a monolithic piece of piezoelectric material. In FIG. 13, body/transducer is designated as 1312, and includes a raised portion or ziggurat 1314. The upper electrode is designated 1338, and lies over raised portion 1314. The lower electrode is designated 1340, and underlies the entirety of the lower surface of body/transducer 1312. Of course, the piezoelectric element can be mounted directly on the shaft, or to a holder which is itself mounted to the shaft.

Figure 14:
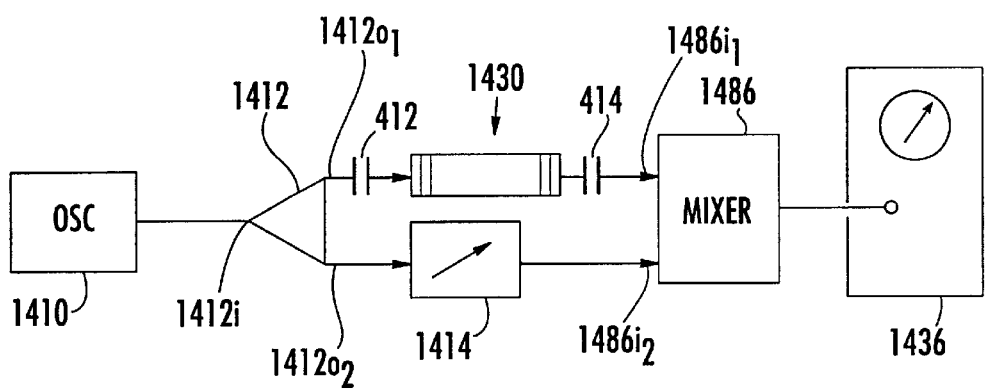
FIG. 14 is a simplified schematic and block diagram of an arrangement for measuring torque in which an oscillator-generator is used, together with a mixer.

FIG. 14 is a simplified schematic and block diagram of an arrangement for measuring torque in which an oscillator is used, together with a mixer. In FIG. 14, an oscillator-generator 1410 operates at a fixed frequency, producing alternating signal, which is applied to an input port 1412$i$ of a signal divider or splitter 1412. Signal splitter 1412 divides the signal into two portions, one of which propagates from output port 1412$o_1$ in one arm, and the other of which propagates from output port 1412$o_2$ in a second arm. At some frequencies, it may be possible to substitute a simple three-wire junction for signal splitter 1412. The signal portion leaving output port 1412$o_1$ passes through an arm containing capacitor 412 representing the capacitive coupler of FIGS. 4a, 4b, and 5, and through a piezoelectric transducer 1430, which is, or may be, subject to torque which is to be measured, and then through a further capacitor 414 representing the other capacitive coupler. The signal portion leaving output port 1412$o_2$ of splitter 1412 passes through an amplitude andor phase control block 1414 in the second arm, which may include serially connected capacitive or inductive components, if desired. The signal portions which pass through piezoelectric transducer 1430 and amplitude andor phase control block 1414 arrive at a mixer block 1486, which mixes the two signals, and produces sum and difference signal components at frequencies equal to the sum and difference of the oscillator frequency. The difference of the two frequency components is baseband or a direct-voltage (also known as direct-current or dc), and the sum component is at a frequency of twice the oscillator frequency. The sum component is not used, and filters may be used to aid in eliminating any residual effect of the sum component. The difference component, which is the direct component, is the equivalent of a direct signal (voltage or current) which might be produced by the piezoelectric element if direct coupling were available. Such a signal is responsive to the amplitude of the torque, and may be monotonic, proportional or nonlinearly related. In some applications, the signal coming from the transducer can be split and sent through the two arms, and then multiplied and filtered in order to produce the output DC.

Figure 15:
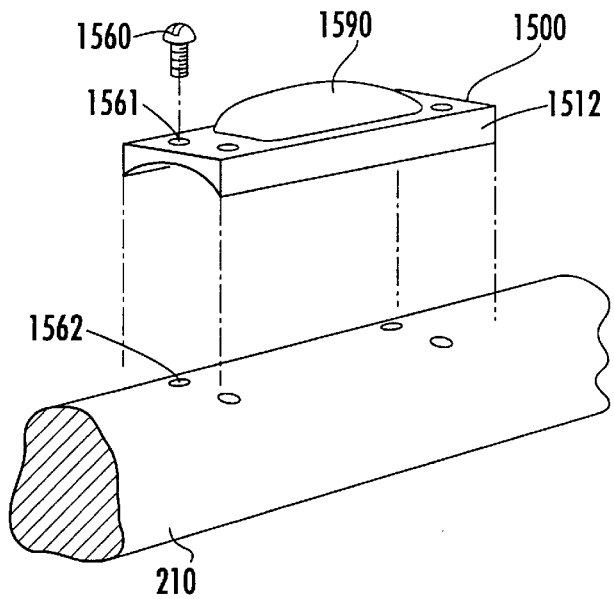
FIG. 15 is a simplified perspective or isometric view, partially exploded, illustrating a sensor mounting arrangement which does not require a flat on the shaft.

FIG. 15 is a simplified, exploded view of a shaft 210 which is not fitted with a flat, but which has a plurality of threaded apertures, one of which is designated 1562, dimensioned to accept mounting screws, one of which is designated 1560. The sensor mount is designated 1500, and includes a body 1512 which defines a plurality of apertures, one of which is designated 1561, spaced in the same manner as apertures 1562. Sensor mount 1500 has a cover 1590. The lower surface of body 1512 is curved to match the curvature of shaft 210, so that the body 1512 can fit tightly against the shaft without machining or otherwise forming a flat into the shaft.

Figure 16:
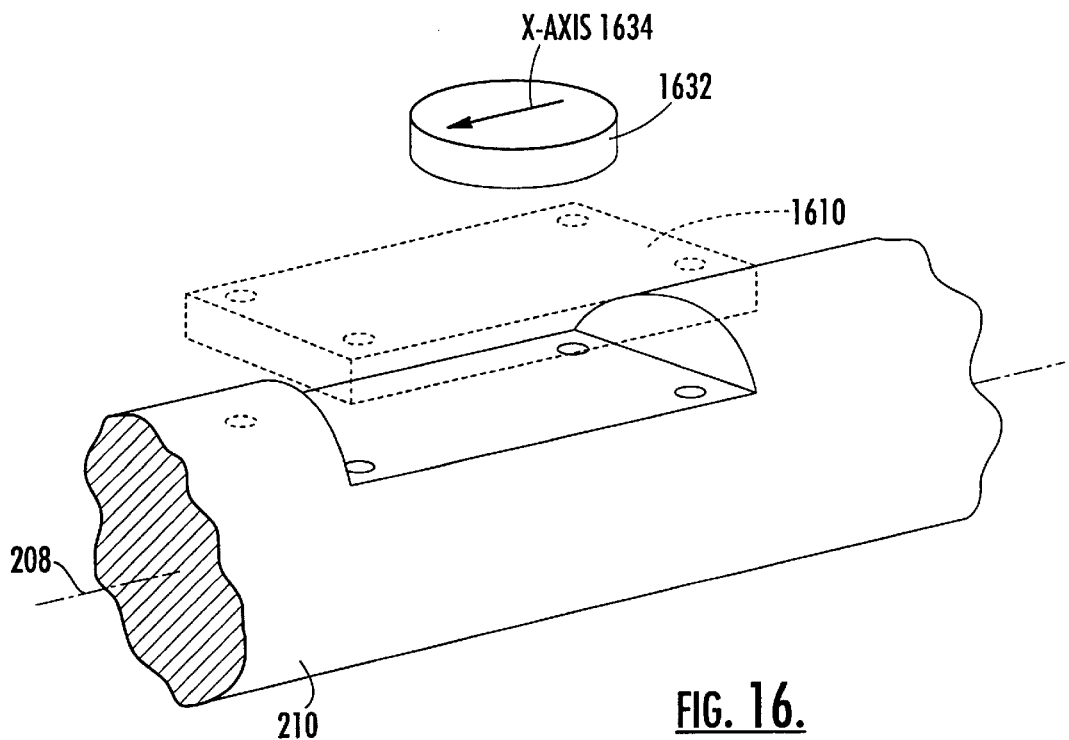
FIG. 16 is a simplified perspective or isometric view, partially exploded, of a torque transducer using a quartz crystal, illustrating an orientation of the x-axis of the crystal.

The piezoelectric transducer material may be of any sort, but the preferred material is quartz, which in the AT cut tends to be self-temperature-compensating. In the case of AT-cut quartz, the X-axis of the piezoelectric material should be oriented parallel with the axis of the shaft (or parallel with the torque axis) for maximum sensitivity. In FIG. 16, shaft 210 rotates about its axis 208, which is the axis about which torque is applied, as described above. An AT-cut quartz transducer 1632 is mounted to shaft 210 by means of a mounting 1610, illustrated in phantom, with the X-axis 1634 of the quartz crystal oriented parallel to the axis 208 of rotation.

In addition to quartz, lithium niobate ($LiNiO_3$) or PZT may be used as a transducer material. Additionally, piezoelectric polymers are known which might find use in the inventive application. In general, any piezoelectric material may be used.

Figure 17A:
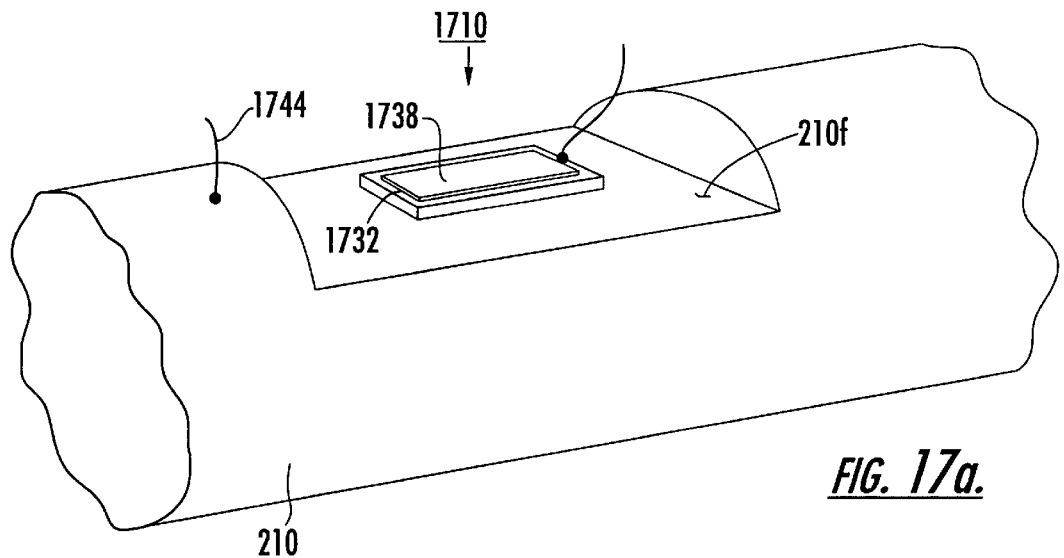
FIG. 17a is a simplified perspective or isometric view of a flat on a shaft on which a piezoelectric transducer is deposited by sputtering, spraying, or other deposition technique.
Figure 17B:
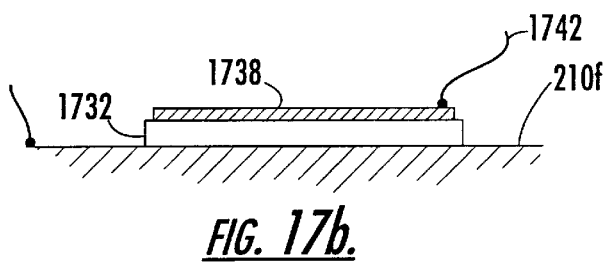
FIG. 17b is a simplified cross-sectional view of the transducer of FIG. 17a, and FIG. 17c illustrates a cross-section of an alternative transducer arrangement.
Figure 17C:
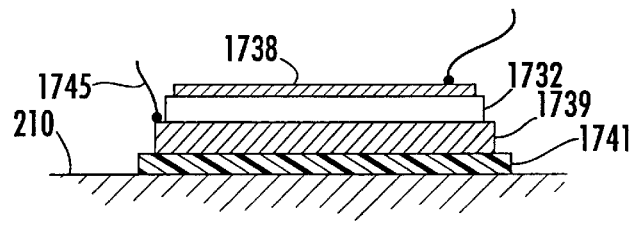

FIGS. 17a and 17b illustrate a shaft 210 with a flat 210f. A piezoelectric transducer 1710 produced by a deposition method, rather than by application of a discrete device, is illustrated as being supported by the flat. As illustrated in FIGS. 17a and 17b, the transducer 1710 includes a piezoelectric element 1732 and an overlying contact electrode 1738. In the arrangement of FIGS. 17a and 17b, the shaft is one electrode. The deposited transducer material may be quartz, lithium niobate, or any other piezoelectric material. The deposition technique may include sol-gel, sputtering, vapor deposition, or crystal growth directly on the flat 210f. In FIG. 17c, an alternative arrangement includes layers of insulation (1741), electrode (1739), piezoelectric material (1732) and electrode (1738), which allows the electrical connection 1745 to the lower electrode 1739 to be independent of shaft 210.

In general, a piezoelectric element can be of any shape, and can be used to excite a variety of acoustic waves sensitive to the presence of torque. The types of waves used for the excitation may include longitudinal, shear, torsional, plate waves, surface acoustic waves such as Raleigh waves, shear horizontal waves, or skimming bulk waves excited by bulk or interdigital transducers. In principle, any type of the transducer arrangement can be sensitive to the torque. The sensitivity to torque can be explained by the nonlinear theory of piezoelectric materials, in that the torque changes the material constants. The changes in the elastic constants are directly related to the torque. In particular, in piezoelectric materials, the material constants, such as the elastic constant, piezoelectric constant, and dielectric constant are functions of the applied external torque. The generic formula is $$c(T)=c(T=0)\,[1+K\times T] \qquad (1)$$

where:
c is the material constant;
T is the torque;

κ is the corresponding torque material coefficient, and κ has a different value for differing material constants.

Figure 18A:
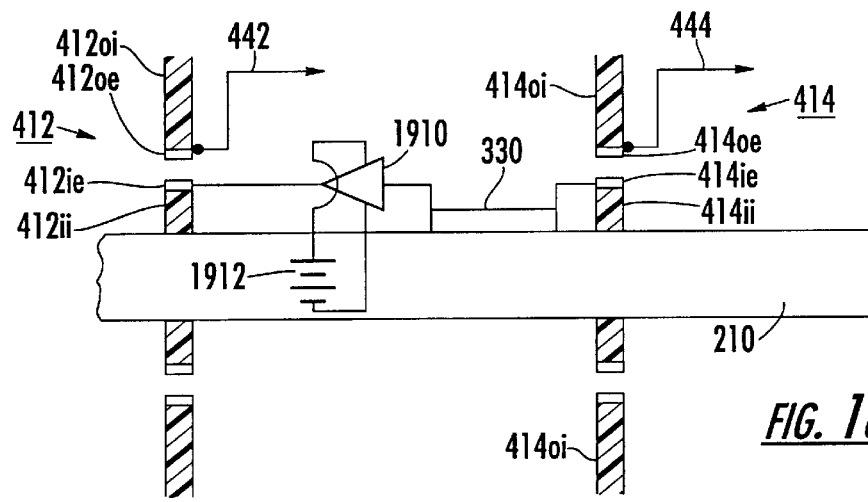
FIGS. 18a, 18b, and 18c illustrate various powering schemes for energizing an electronic device associated with the piezoelectric transducer, and mounted on the rotating shaft therewith.
Figure 18B:
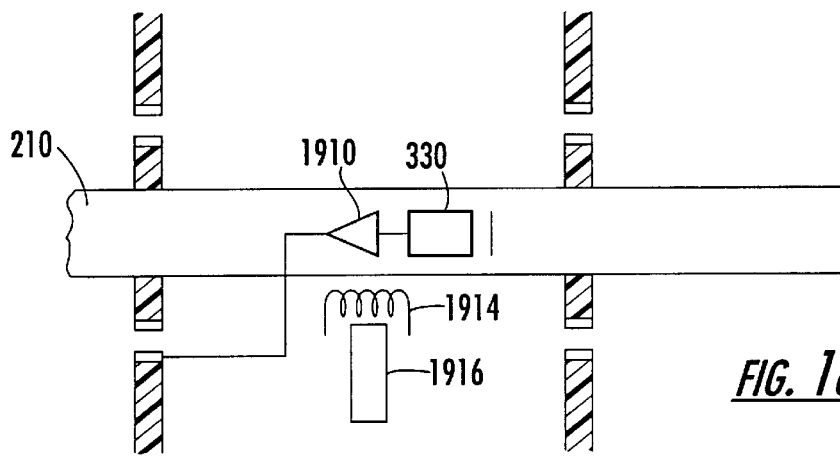
Figure 18C:
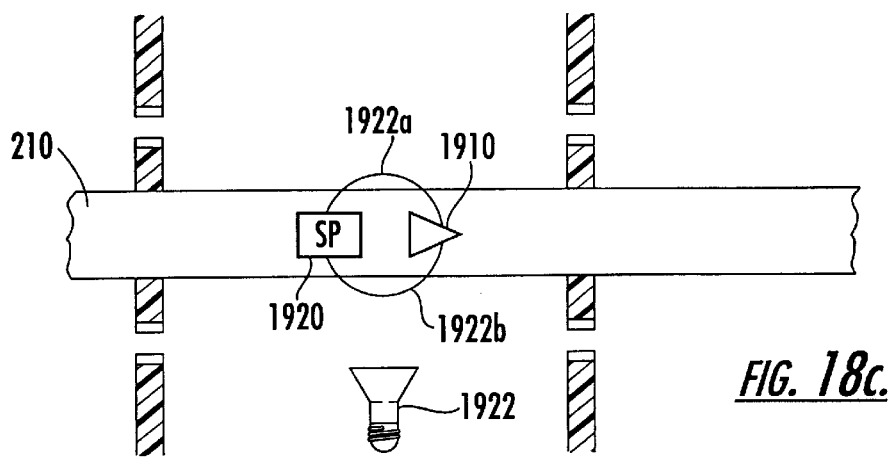

FIG. 18a is a simplified diagram illustrating a structure such as that of FIGS. 4a, 4b, and 4c, including a shaft 210, a piezoelectric transducer 330 mounted for rotation with the shaft, and an active electronic device, illustrated as an amplifier 1910, also mounted on the shaft for rotation. The structure of FIG. 18a also includes a first coupler 412 having an inside insulator 412ii mounted on the shaft and supporting an inside electrode 412ie, which faces a corresponding fixed or outer electrode 412oe, supported on an outside dielectric insulating element 412oi. A similar coupler 414 has an inside insulator 414ii mounted on the shaft and supporting an inside electrode 414ie, which faces a corresponding fixed or outer electrode 414oe, supported on an outside dielectric insulating element 414oi. Electrical power to energize the electronic device 1910 is provided by a battery 1912 mounted on the shaft for rotation therewith, and electrically coupled to power the electronic device. As an alternative, an electrical generator can be associated with the rotating shaft, to extract energy from the shaft's rotation, and convert the energy into electricity for powering the electronic device. FIG. 18b illustrates a shaft 210 on which a coil 1914 is mounted for rotation therewith, and a magnet 1916 is at a fixed location, in which the coil sweeps through the magnetic field of the magnet at each turn of the shaft so as to generate an alternating or pulsatory voltage at the coil. In the arrangement of FIG. 18b, the voltage generated by the coil may be used directly for powering an electronic device which accepts alternating or pulsatory voltage excitation, or the coil may be coupled to the electronic device to be powered by way of a rectifier-and-filter (not illustrated) arrangement, for generating direct voltage. FIG. 18c is even more simplified than FIGS. 19a and 19b, in that only shaft 210, the electronic device to be powered (1910), and its power source are illustrated. In FIG. 18c, the power source is illustrated as a rectangular solar panel (SP) or cell 1920, which is illuminated during each rotation of the shaft by a lamp 1922, so that the solar cell 1920 produces energizing voltage, which is coupled by paths 1922a and 1922b to electronic device 1910. In general, a solar cell or panel generates direct voltage during, or in, constant illumination, so surrounding the shaft with a plurality of lamps would provide a substantially constant voltage output from a single cell mounted on one side of the shaft. More cells, connected in electrical parallel, but physically distributed around the shaft, would provide more constant voltage, and at a higher current capacity, than a single cell. As an alternative, a single solar cell, in conjunction with a single lamp, could provide continuous power so long as a storage device, such as a capacitor, were used to store power during those intervals in which the solar panel was not illuminated.

Figures 19A, 19B:
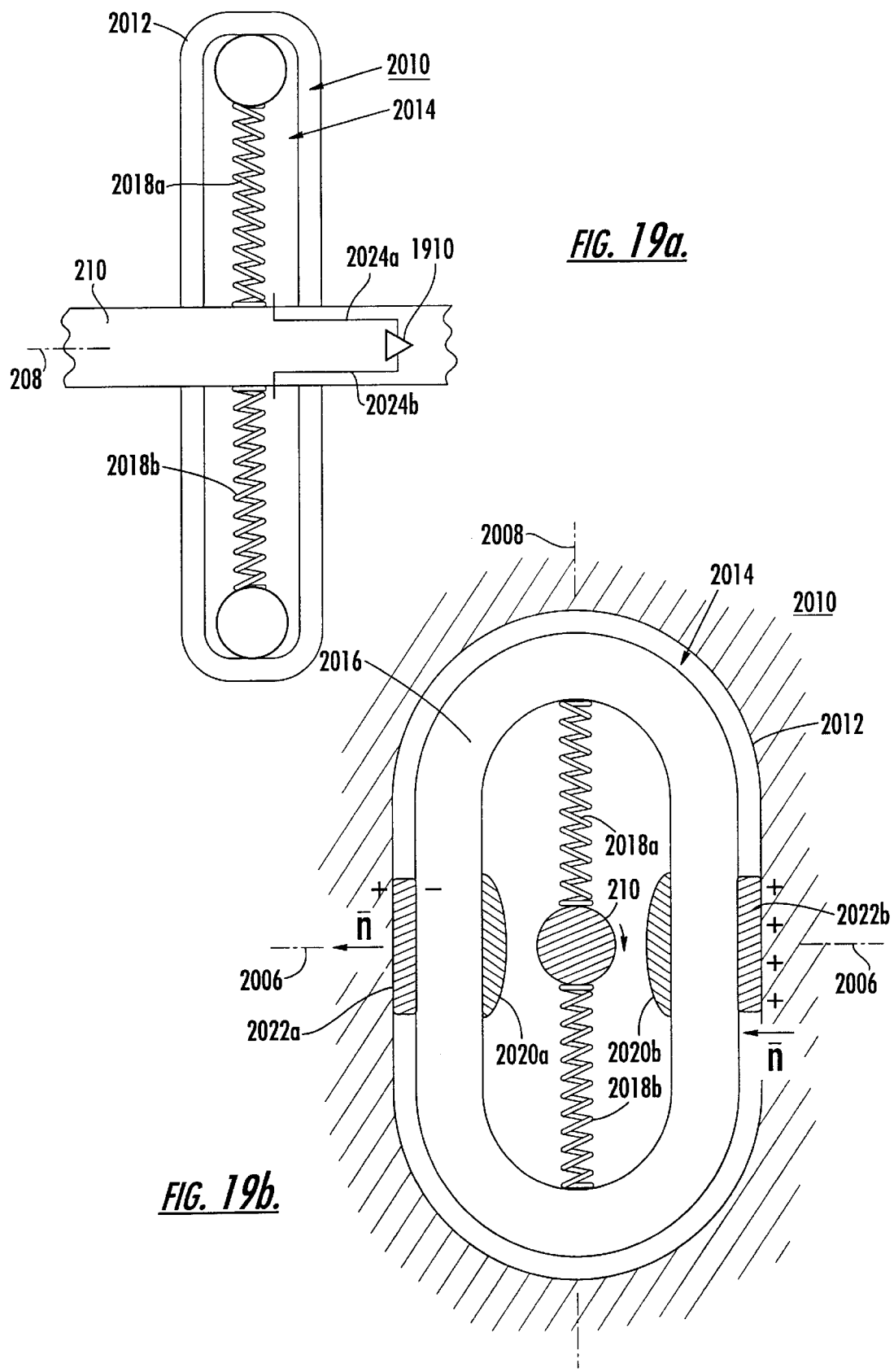
FIGS. 19a and 19b are simplified side elevation and axial cross-sectional views, respectively, of a piezoelectric electric power generator which may be used to power an electronic device associated with the piezoelectric transducer, and which is mounted on the rotating shaft therewith.

In the case of a shaft that changes rotational velocity during normal operation, a "swinging weight" such as is used to power some electrical watches, could be used in conjunction with such a variable-speed shaft to provide power. A piezoelectric electrical generator is illustrated in FIGS. 19a and 19b, which uses the rotational energy of the shaft to provide power from a piezoelectric transducer. In FIGS. 19a and 19b, shaft 210 carries an electronic device to be powered, which is illustrated as an amplifier 1910. The piezoelectric generator 2010 includes a static housing 2012 which has an eccentric, egg-shaped, elliptical, or other smooth interior cavity 2014 surrounding shaft 210. Cavity 2014 has a major or large diameter which is along a vertical axis 2008, and a minor or smaller diameter aligned with axis 2006. Within cavity 2014, a flexible web structure including a flexible web 2016 is held to the shaft 210 by means of a pair of springs 2018a and 2018b. A pair of proof masses or weights 2020a and 2020b are affixed to locations on the interior surface of the web 2016 at locations which are diametrically opposite to each other. At locations on the exterior surface of web 2016 corresponding to the locations of the weights 2020a and 2020b, piezoelectric masses or transducers 2022a and 2022b are attached. It will be appreciated that as the web 2016 rotates within the cavity 2014, the locations at which the weights 2020a and 2020b are juxtaposed with piezoelectric transducers 2022a and 2022b are recurrently on a relatively large diameter portion of the cavity (aligned with axis 2008) and on a relatively small diameter portion of the cavity (aligned with axis 2006). As the web 2016 rotates in consonance with rotation of the shaft 210, the weights or masses 2020a and 2020b press the piezoelectric transducers 2022a and 2022b, respectively, against the walls of the cavity, at least along the smaller diameter axis. This pressure, in turn, produces a bending which strains the transducer, and electrical voltage is generated by the transducers in response to the pressing. Electrically conductive leads (not illustrated in FIG. 19b) connect to the transducers 2022a and 2022b, run along the inside or outside of the web 2016 to a location adjacent the juncture of web 2016 with the springs 2018a and 2018b, and run along the springs down to the shaft. From the juncture of the springs 2018a and 2018b with the shaft, the conductors, illustrated as 2024a and 2024b in FIG. 19a, run along the shaft to the electronic device to be powered.

Figure 20A:
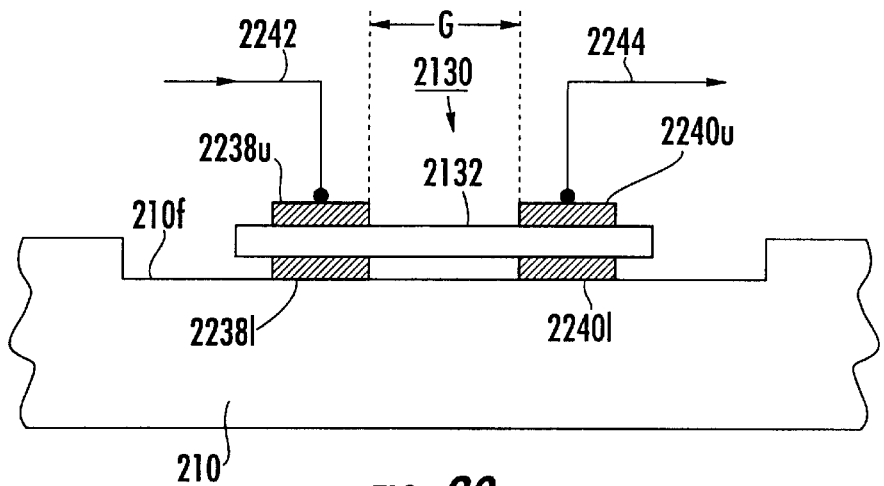
FIGS. 20a and 20b are simplified side elevation cross-sectional views of multielectrode transducers which may be used in conjunction with the invention.
Figure 20B:
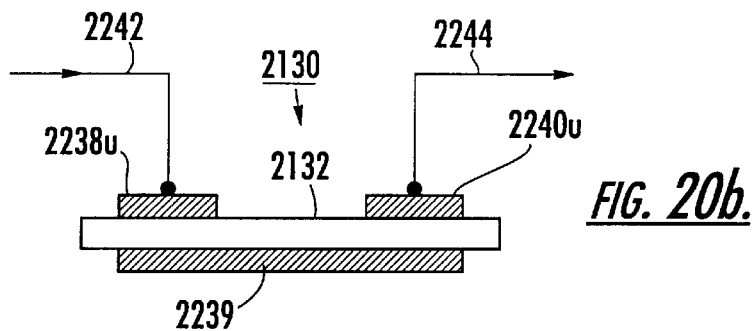

A piezoelectric transducer used for torque sensing according to the invention may have a multielectrode structure rather than only two electrodes. FIG. 20a is a simplified side elevation cross-section of a four-electrode transducer. In FIG. 20a, shaft 210 defines a flat 210f. A piezoelectric transducer 2130 has a body 2132 which bears two upper electrodes 2238u and 2240u, and two lower electrodes 2238l and 2240l which are registered therewith. The two lower electrodes 2238l and 2240e are mounted on the flat 210f, so that the electrically conductive shaft interconnects the lower electrodes. The electrical connections to the upper electrodes include conductors 2242 and 2244. The dimension of the gap G between the facing edges of the upper electrodes at least partially determines the performance of the transducer. In FIG. 20b, the body of the transducer is 2132, and the upper electrodes are 2238u and 2240u, and a single lower electrode 2239 extends across both upper electrodes.

Figure 21:
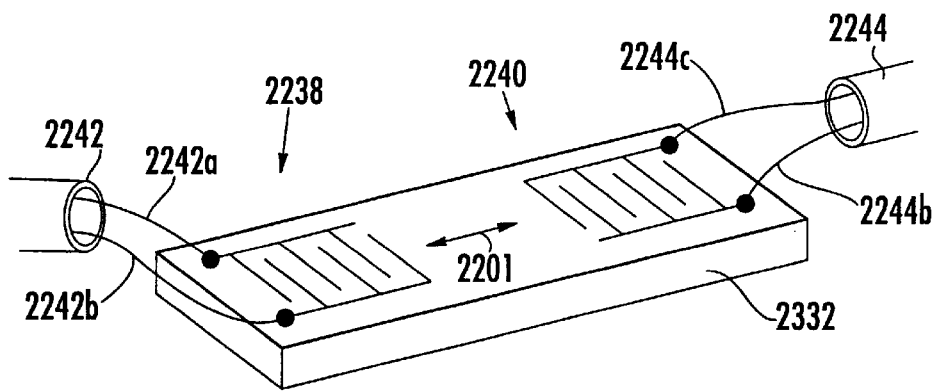
FIG. 21 is a simplified perspective or isometric view of a surface-acoustic-wave (SAW) transducer which may be used in a torque measuring system according to the invention.

FIG. 21 is a simplified perspective or isometric view of an interdigital transducer which may be used in a torque measuring system according to the invention. In FIG. 21, the piezoelectric material or substrate is designated 2232. The upper surface of substrate 2232 carries two sets of interdigitated transducer conductors, with one set designated as 2238, and the other as 2240. Each transducer conductor set 2238, 2240 includes, as is well known in the piezoelectric transducer arts, interdigitated or alternating conductive fingers, arrayed in the direction in which the surface-generated acoustic wave is to propagate, which direction is indicated by the arrow 2201. The individual conductors of interdigitated conductor set 2238 are connected by way of conductors 2242a and 2242b to a conductor set 2242. Similarly, individual conductors of interdigitated conductor set 2240 are connected by way of conductors 2244a and 2244b to a conductor set 2244. It should particularly be noted that the structure of FIG. 21 can be used as a delay line when both sets 2238 and 2240 of transducer conductors are used, or it may be used as a resonant device if only one set of transducer conductors 2238, 2240 is available.

Figure 22A:
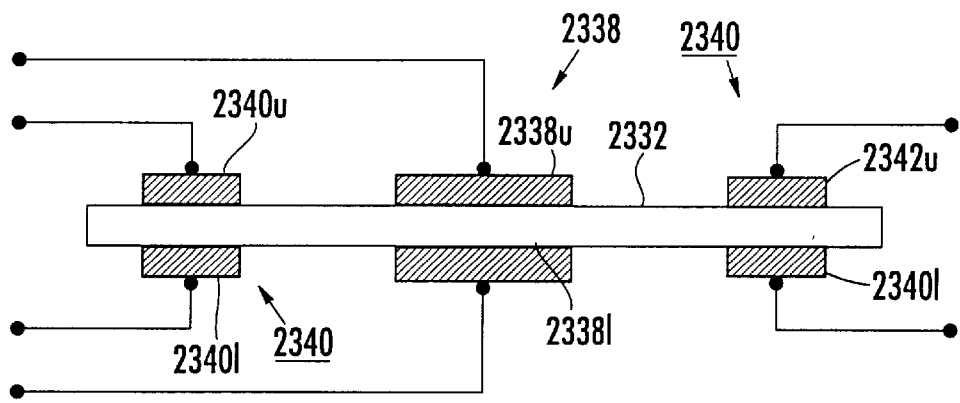
FIG. 22a is a simplified cross-sectional side elevation view of a multielectrode transducer in accordance with an aspect of the invention, which is particularly advantageous for self-calibration andor self-diagnosis.
Figure 22B:
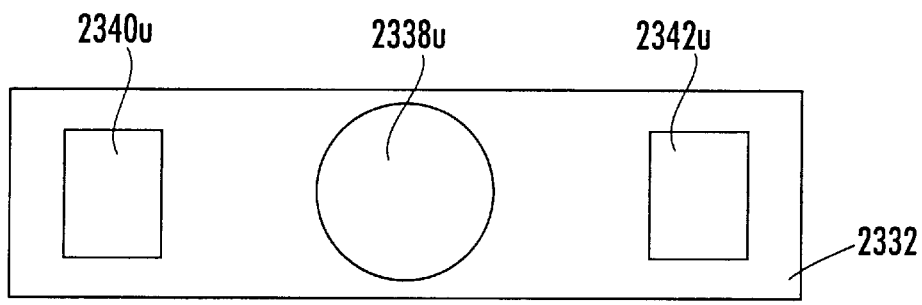
FIG. 22b is a plan view thereof.

Self-calibration of the torque sensors can be accomplished using a multielectrode piezoelectric structure, such as the structure of FIG. 22a. In FIG. 22a, the piezoelectric transducer body 2332 bears three sets of electrodes. A center set 2338 of electrodes includes an upper electrode 2338u and a lower electrode 2338l. Left and right electrode sets 2340 and 2342 include upper electrodes 2340u, 2342u, respectively, and lower electrodes 2340l and 2342l, respectively. The main electrodes for sensing torque as described in conjunction with FIGS. 3a, 3b, 3c, 4a, 5, and 8 are the center electrodes 2338. When the transducer of FIGS. 22a and 22b is subjected to a particular strain, the result is a particular or corresponding voltage at its center electrodes. It is possible to generate the particular value of strain by application of a known voltage to the auxiliary electrodes of sets 2340, 2342. Thus, it is possible to apply a known strain to calibrate the system by applying a known voltage to the auxiliary electrodes, and determining the voltage at the center electrodes in response to the applied strain. The center electrodes, so calibrated, can then be used to determine the strain applied by the shaft, which translates into torque.

When using a frequency-variable sensing arrangement, application of the voltage to the auxiliary electrodes of the structure of FIGS. 22a, 22b causes a known strain, as mentioned. The applied strain-inducing voltage can be plotted against frequency, and the resulting plot is nearly linear.

Figure 23A:
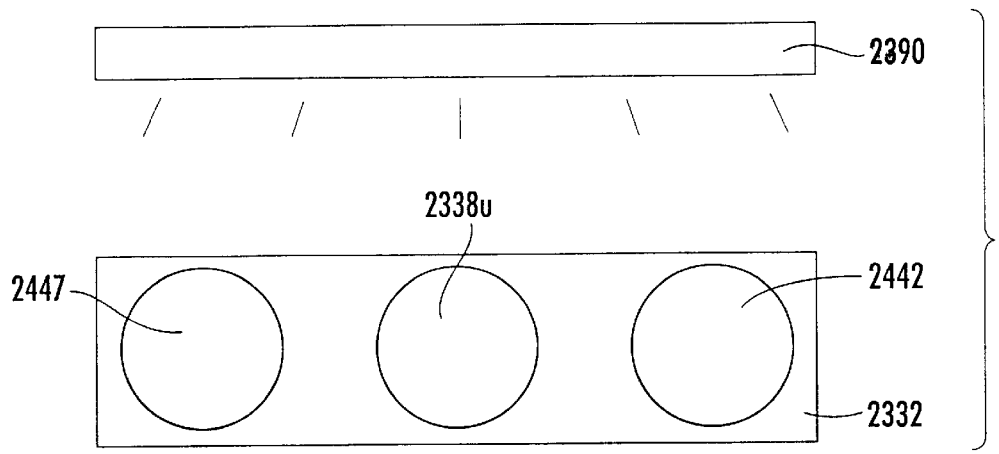
FIG. 23a is a simplified representation of a transducer according to an aspect of the invention, in which a radiant energy source radiates energy generally toward a surface of the transducer.
Figure 23B:
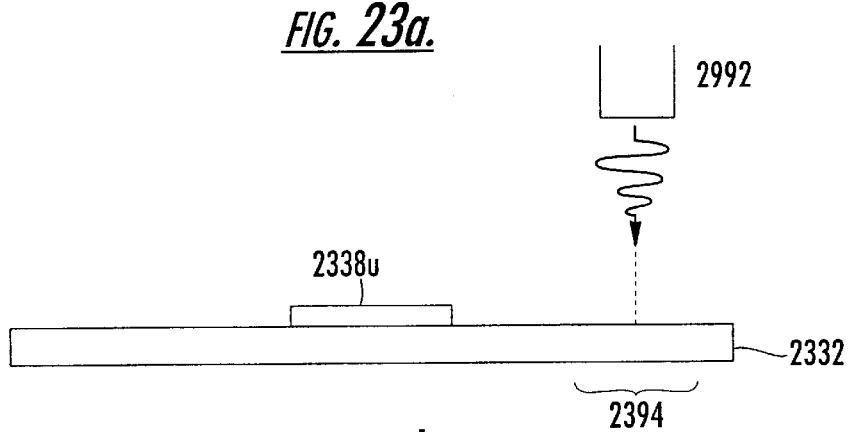
FIG. 23b is a simplified elevation view of a transducer in which a radiant energy source directs energy onto a portion of the upper surface of the transducer.
Figure 23C:
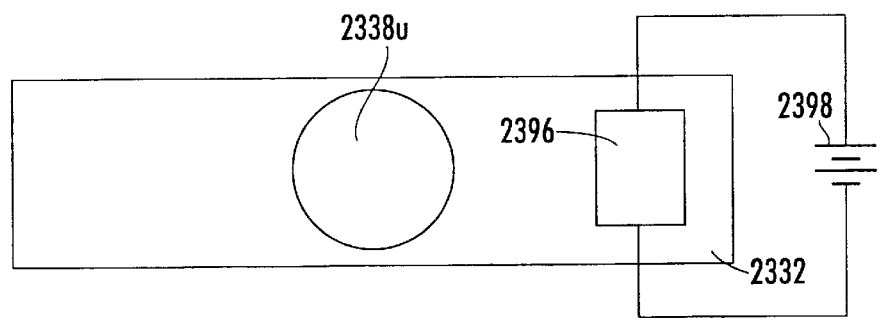
FIG. 23c is a simplified representation of a transducer having a resistor mounted on a surface thereof, which is heated by an electrical source, and FIGS. 23d and 23e together are a simplified representation of another arrangement for generating a calibration strain in a piezoelectric transducer by use of an auxiliary piezoelectric transducer.

Another calibration technique which can be used is to differentially heat certain locations in the piezoelectric transducer, such as locations 2442 in FIG. 23a, corresponding to those at which the auxiliary electrodes are placed in FIG. 22b. The heating in the case of FIG. 23a is provided by a radiant source 2390, which illuminates the entire surface of the transducer. The differential heating which results in the strain results from heating of the upper surface of the transducer relative to the lower surface. If radiant energy absorbers are placed at locations 2442 of FIG. 23a, the differential heating takes place between the locations of the absorbers and the other locations, as well as between the upper and lower surfaces. The heating can also be performed by a focussed or collimated beam of radiant energy, illustrated as 2992 in FIG. 23b, which preferentially heats the region designated 2994. As illustrated in FIG. 23c, the upper surface of the transducer is fitted with a resistor arrangement illustrated as 2396, which can be heated by passing current therethrough, as suggested by the battery 2398. As in the case of radiant heating, the resistive heating generates thermal energy at the desired location, which causes differential expansion which generates the desired strain. Both of these techniques generate strain by thermal gradients.

Figure 23D:
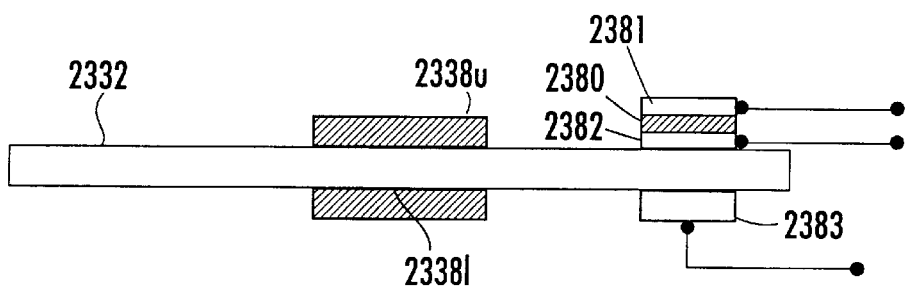
Figure 23E:
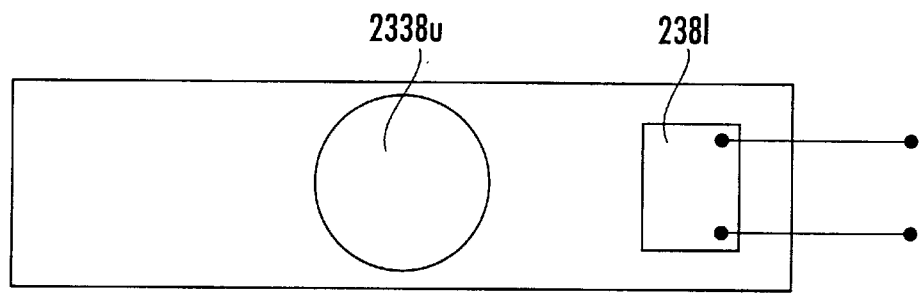

FIGS. 23d and 23e are simplified side elevation and plan views, respectively, of is another arrangement for generating a calibration strain in a piezoelectric transducer. In FIGS. 23d and 23e, an auxiliary piezoelectric element 2380 is mounted on one side of piezoelectric element 2332. An electrode 238a is common to both piezoelectric elements. A voltage applied between electrode 2382 and 2383 creates a strain directly in element 2332. A voltage applied between electrodes 2382 and 2381 creates a strain in the auxiliary piezoelectric element 2380, which causes it to deform or bend. The deformation or bending, in turn, is communicated to piezoelectric element 2332. This allows a larger bending or deformation of piezoelectric element 2332.

Figure 24:
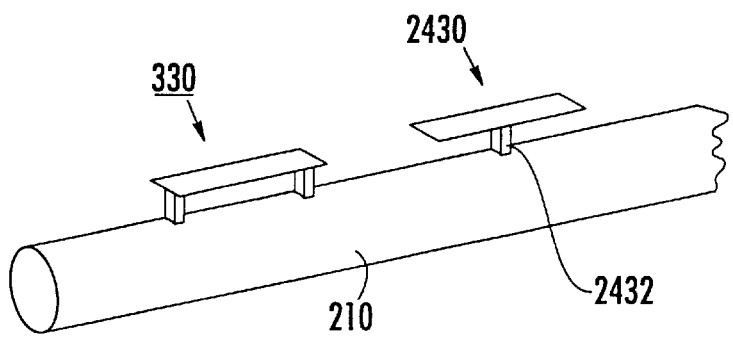
FIG. 24 is a simplified perspective or isometric view of a torque-measuring transducer mounted on a shaft together with a further transducer mounted in a manner which is insensitive to torque.

In FIG. 24, the shaft 210 carries a torque-measuring transducer, such as 330, according to the invention, together with a second transducer 2430, which is identical, but which is mounted, as with a single mechanical connection 2432 to the shaft, in such a manner as to be insensitive to the torque.

The parameters of the torque-measuring transducer 330 of FIG. 24 are normalized or corrected for non-torque parameters, such as, for example, temperature, by subtraction of the corresponding parameter of the non-torque-measuring transducer 2430. Such correction can be performed by electronic devices mounted on the shaft, or both of the transducers can be coupled by capacitive couplers to off-shaft fixed locations, and the correction can be done off-shaft.

The invention may find use in any torque-transfer context. In particular, in the automobile industry, the torque sensor may be used as a sensor of axle shaft torque in conjunction with a traction control system or antiskid braking system, and may also be used to aid in control of the engine, so as to maximize fuel efficiency by maximizing the torque/fuel flow ratio. Also, the steering-wheel torque may be measured to assist in control of the power steering gain or amplification. Also, emission tests are conducted on dynamometers; a torque measuring and control system using sensors in accordance with the invention may be used to provide proper loading of the automobile under test. In the aircraft industries, the shaft torque of helicopter rotors, aircraft propellers, and the like may be monitored andor controlled. Torque control systems may be used in consumer electronics such as grass trimmers, vacuum cleaners, and in rotating tools such as power drills, screwdrivers, and wrenches. In industry, turbines, engines, motors, and windmills may use the sensors.

Other embodiments of the invention will be apparent to those skilled in the art. For example, while the term "terminal" or "terminals" has been used to signify the end or termination of an electrical conductor, the term should be interpreted in a general manner, and not restricted to those devices, which are often called "terminals," for making separable connections. The term "between" when applied to electrical connections should not be interpreted to have a physical meaning; rather, the term is used to identify the elements to which electrical coupling is made. Similarly, the term "across" has a meaning in the electrical arts which is not identical to its meaning in mechanics. While block 814 of FIG. 8 has been illustrated as being at a particular location in the circuit, the phase shifts andor amplitude control which it provides may be located anywhere in the circuit, or may be absent, depending upon the characteristics of the feedback loop. While the torque sensor has been illustrated as being coupled to the shaft by means of screws and corresponding apertures, any known type of mechanical coupling device can be used to hold the sensor in place, including snap-type devices, glues, and the like. If glue is used, it may be desirable to use electrically conductive glue under some circumstances; at high frequencies, the capacitance between the shaft and the sensor mount may provide all the electrical coupling that is needed, even in the presence of electrically nonconductive adhesive. The terms electrically "conductive" or "nonconductive" are generally understood by those skilled in the art, even though all electrical "nonconductors" exhibit some electrical conduction or leakage, and all "conductors" exhibit some losses or resistance to the flow of electrical current. Those skilled in the art will recognize that there is little or no difference in principle between "capacitive" coupling by means of juxtaposed elements, as described in conjunction with, for example, FIGS. 4a, 4b, 4c, 5, 8, 9a, and 9b, and electromagnetic coupling by means of antennas; in general, the "capacitance" terminology is used for coupling between elements which are close in terms of wavelength, while the "electromagnetic" terminology, or other terms such as "radio," are used for coupling between elements which are distant from each other in terms of wavelength (that is, beyond the "near field" of an antenna). While the electronic device requiring power has been described as being an amplifier, it may be any kind of signal processor, analog or digital; it is particularly contemplated that the processor may be used to perform temperature and other compensations to provide a more exact indication of the torque being measured.

Thus, according to an aspect of the invention, a method is described for measuring the torque to which a torque-bearing member (210, 310), such as a shaft, is subjected. The torque results in a strain along at least a portion of the length of the torque-bearing member (210, 310) or shaft. The method includes the step of affixing a piezoelectric transducer (330) to the portion of the length of the torque-bearing member (210, 310). The piezoelectric transducer (330) includes electrodes (338, 340) across which a voltage is generated in response to strain. A signal responsive to the voltage is coupled to a signal-measuring instrument (336, 536, 836), for producing an indication of the magnitude of the signal, and consequently of the magnitude of the torque. In a particular mode of this method, the coupling step includes the step of coupling the voltage to the instrument (336, 536, 836) by way of a capacitive device (412, 414). A particularly advantageous mode of the invention includes the further step of rotating the torque-bearing member or shaft (210, 310) relative to an underlying structure (412b, 414b) or base. The step of coupling the voltage by way of a capacitive device (412, 414) comprises the step of coupling the voltage by way of (a) a generally annular first electrode (412ie) coupled to an electrode (338) of the piezoelectric transducer (330), where the first electrode (412ie) rotates in consonance with the torque-bearing member (210, 310), or (b) a generally annular second electrode (412oe) concentric with the first circular electrode (412ie), which second electrode (412oe) is spaced away from the first electrode (412ie) by a gap (412g), and is affixed to the underlying structure (412b, 414b).

The electrical connections in the abovementioned method are made by the steps of connecting the piezoelectric transducer (330) in circuit with an alternating electrical excitation arrangement (510; 808) so that an alternating voltage is applied across (or through) the piezoelectric transducer (330), upon the completion of which at least a component of the voltage appearing across the transducer (330) is measured to determine the torque. The step of connecting the piezoelectric transducer (330) in circuit may include the step of connecting the transducer (330) in the feedback path (808) of an electrical oscillator. As an alternative, the step of connecting the transducer (330) in circuit may include the step of connecting the transducer (330) to receive at least a portion of the output signal of an electrical oscillator (510). The affixing step may include the step of affixing to the torque-bearing member (210, 310) a holder (1010, 1110, 1332) carrying the piezoelectric transducer (330).

In another method according to an aspect of the invention, the torque to which a torque-bearing member (210, 310) is subjected is measured. The torque results in a strain along at least a portion of the length of the torque-bearing member (210, 310). The method according to this aspect of the invention includes the step of affixing to the appropriate portion (portions 306, 406, 506) of the length of the torque-bearing member (210, 310) a piezoelectric transducer (330) (330) which changes its electrical properties in response to torque, and which includes electrodes (338, 340) for coupling signal between the transducer (330) (330) and other circuits. An alternating electrical signal is coupled through the transducer (330) (330) by way of the electrodes (338, 340) to produce an alternating electrical signal having at least one characteristic which depends upon the torque. At least the characteristic of the alternating electrical signal, as modified by the transducer (330) (330), is measured, to determine at least one of the magnitude and the phase of the torque. The step of affixing in this method may include the step of affixing to the portion of the torque-bearing member (210, 310) a holder (1010, 1110, 1332) which includes the piezoelectric transducer (330) (330). In one of two alternative embodiments of this method, the step of coupling an alternating electrical signal includes the step of connecting the piezoelectric transducer (330) (330) in the feedback loop of an amplifier, to thereby form an oscillator which generates the alternating electrical signal with a frequency which varies in response to the characteristic of the piezoelectric transducer (330) (330). In the other of the two alternative embodiments, the step of coupling an alternating electrical signal includes the step of connecting the piezoelectric transducer (330) (330) to receive the alternating electrical signal from an oscillator which operates at a fixed frequency, as a result of which the amplitude of the signal component appearing across the piezoelectric transducer (330) (330) is responsive (FIG. 7) to the characteristic of the piezoelectric transducer (330) (330). In this method, the step of measuring may include the further steps of (a) coupling the alternating electrical signal, which has at least one characteristic which depends upon the torque, to a first input port ($1486i_1$) of a mixer (1486), (b) coupling a sample of the alternating electrical signal from the oscillator (510, 808) to a second input port ($1486i_2$) of the mixer (1486), (c) in the mixer (1486), mixing the alternating electrical signal having at least one characteristic which depends upon the torque with the sample of the alternating electrical signal from the oscillator, for thereby producing a baseband signal component, and (d) measuring a characteristic of the direct (DC) signal component.

In a particular apparatus according to an aspect of the invention, a piezoelectric transducer (330) arrangement includes a piezoelectric transducer (330) including first and second electrical electrodes (338, 340), and having defining dimensions. A base (1012, 1112, 1312) is included, which has an aperture (1040) dimensioned for accepting the piezoelectric transducer (330) (330), and which further includes a fastening arrangement (1061) adapted for fastening the base (1012, 1112, 1312) to a torque-bearing structure (412b, 414b). A holding arrangement (1046) is mechanically coupled to the base (1012, 1112, 1312) and to the piezoelectric transducer (330) (330), for holding the transducer (330) in the aperture (1040). A first electrical connection arrangement (1012) is mounted on the base (1012, 1112, 1312). A second electrical connection arrangement (1014) is also mounted on the base (1012, 1112, 1312). A first electrical conductor (1042) is coupled to the first electrical electrode (1038) and to the first electrical connection arrangement (1012), and a second electrical conductor (1044) is coupled to the second electrical electrode (1040) and to the second electrical connection arrangement (1014). In a particular embodiment of this arrangement, a protective cover (1090) is mounted on the base (1012, 1112, 1312) over the piezoelectric transducer (330). In one embodiment, the arrangement of the base (1012, 1112, 1312) and transducer (330) (330) is monolithic.

What is claimed is:

1. A method for measuring the torque to which an elongated torque-bearing member defining an axis of elongation is subjected about said axis of elongation, which torque results in a strain along at least a portion of the length of said torque-bearing member, said method comprising the steps of:

affixing to said portion of said length of said torque-bearing member a piezoelectric transducer which includes electrodes lying on different, mutually parallel planes of said piezoelectric transducer, across which electrodes at least one of a voltage and a charge is generated in response to said strain;

coupling a signal, responsive to said one of said voltage and charge to a signal-measuring instrument, for producing an indication of the magnitude of said signal and consequently of the magnitude of said torque.

2. A method according to claim 1, wherein said coupling step includes the step of coupling said one of said voltage and said charge to said instrument by way of a capacitive device.

3. A method according to claim 1, wherein said coupling step includes the step of coupling said one of said voltage and said charge to said instrument by way of an antenna.

4. A method according to claim 2, further comprising the steps of:

rotating said torque-bearing member relative to an underlying structure, and wherein said step of coupling said voltage by way of a capacitive device comprises the step of coupling said voltage by way of (a) a generally annular first electrode coupled to an electrode of said piezoelectric transducer, which first electrode rotates in consonance with said torque-bearing member and (b) a generally annular second electrode concentric with said first circular electrode, which second electrode is spaced away from said first electrode by a gap, and is affixed to said underlying structure.

5. A method according to claim 1, further comprising the steps of:

connecting said piezoelectric transducer in circuit with an alternating electrical excitation arrangement so that an alternating voltage is applied across said piezoelectric transducer; and measuring a characteristic of at least a component of the voltage appearing across said transducer.

6. A method according to claim 5, wherein said characteristic is frequency.

7. A method according to claim 5, wherein said characteristic is one of amplitude and phase.

8. A method according to claim 5, wherein said step of connecting said piezoelectric transducer in circuit includes the step of connecting said transducer in a feedback path of an electrical oscillator.

9. A method according to claim 5, wherein said step of connecting said piezoelectric transducer in circuit includes the step of connecting said transducer to receive at least a portion of an output signal of an external electrical generator.

10. A method according to claim 5, wherein said step of connecting said piezoelectric transducer in circuit includes the step of connecting said transducer to receive at least a portion of an output signal of an electrical oscillator.

11. A method according to claim 1, wherein said affixing step includes the step of affixing to said torque-bearing member a holder carrying said piezoelectric transducer.

12. A method for measuring the torque to which a torque-bearing member is subjected, which torque results in a strain along at least a portion of the length of said torque-bearing member, said method comprising the steps of:

affixing to said portion of said length of said torque-bearing member a piezoelectric transducer including electrodes lying in different, mutually parallel planes on said piezoelectric transducer, which changes its electrical properties between electrodes in response to torque, and which includes electrical paths for coupling signal between said transducer and other circuits;

coupling an alternating electrical signal through said transducer by way of said electrodes to produce an alternating electrical signal having at least one characteristic which depends upon said torque; and measuring at least said characteristic of said alternating electrical signal as modified by said transducer, to determine at least one of the magnitude and the direction of said torque; wherein said step of affixing includes the step of affixing to said portion of said torque-bearing member a holder which includes said piezoelectric transducer.

13. A method for measuring the torque to which a torque-bearing member is subjected, which torque results in a strain along at least a portion of the length of said torque-bearing member, said method comprising the steps of:

affixing to said portion of said length of said torque-bearing member a piezoelectric transducer including plural electrodes lying in different, mutually parallel planes of said piezoelectric transducer, which changes its electrical properties in response to torque, and which includes electrical paths for coupling signal between said transducer and other circuits;

coupling an alternating electrical signal through said transducer by way of said electrodes and said electrical paths to produce an alternating electrical signal having at least one characteristic which depends upon said torque; and measuring at least said characteristic of said alternating electrical signal as modified by said transducer, to determine at least one of the magnitude and the direction of said torque;

wherein said step of coupling an alternating electrical signal includes the step of connecting said piezoelectric transducer to receive said alternating electrical signal from an external oscillator which operates at a fixed frequency, whereby the amplitude of the a component of said alternating electrical signal appearing across said piezoelectric transducer is responsive to said characteristic of said piezoelectric transducer.

14. A method for measuring the torque to which a torque-bearing member is subjected, which torque results in a strain along at least a portion of the length of said torque-bearing member, said method comprising the steps of:

affixing to said portion of said length of said torque-bearing member a piezoelectric transducer which changes its electrical properties in response to torque, and which includes electrodes for coupling signal between said transducer and other circuits;

coupling an alternating electrical signal through said transducer by way of said electrodes to produce an alternating electrical signal having at least one characteristic which depends upon said torque; and measuring at least said characteristic of said alternating electrical signal as modified by said transducer, to determine at least one of the magnitude and the direction of said torque;

wherein said step of coupling an alternating electrical signal includes the step of connecting said piezoelectric transducer to receive said alternating electrical signal from an oscillator which operates at a fixed frequency, whereby the amplitude of the signal component appearing across said piezoelectric transducer is responsive to said characteristic of said piezoelectric transducer.

15. A method according to claim 14, wherein said step of measuring includes the further steps of:

coupling said alternating electrical signal having at least one characteristic which depends upon said torque to a first input port of a mixer;

coupling a sample of said alternating electrical signal from said oscillator to a second input port of said mixer;

in said mixer, mixing said alternating electrical signal having at least one characteristic which depends upon said torque with said sample of said alternating electrical signal from said oscillator, for thereby producing one of direct current and a baseband signal component; and measuring a characteristic of said one of said direct current and said baseband signal component.

16. A torque measuring arrangement, comprising:

a torque-bearing member extending at least between first and second noncoincident, parallel planes;

a piezoelectric element including a dimension lying parallel to the axis of the torque applied to said torque-bearing member;

a strain-conveying coupling member coupled to said torque-bearing member at said first and second planes, and also coupled to said piezoelectric element at a location lying between said first and second planes, for thereby transmitting at least some strain to said piezoelectric element in response to torque applied to said torque-bearing member; and a paralleling member coupled to said strain-conveying coupling member at a first location lying between said piezoelectric element and said first plane, and at a second location lying between said piezoelectric element and said second plane, for reducing the strain applied by said first coupling element to said piezoelectric element in response to said torque applied to said torque-bearing member.

* * * * *